(12) United States Patent
Goel et al.

(10) Patent No.: US 8,425,734 B2
(45) Date of Patent: Apr. 23, 2013

(54) MEMBRANE-BASED HYBRID PROCESS FOR SEPARATION OF MIXTURES OF ORGANICS, SOLIDS, AND WATER

(75) Inventors: Manish Goel, Berkeley, CA (US); Chetan Prakash Mittal, Noida Up (IN)

(73) Assignee: I3 Nanotec LLC, Emeryville, CA (US)

( * ) Notice: Subject to any disclaimer, the term of this patent is extended or adjusted under 35 U.S.C. 154(b) by 1179 days.

(21) Appl. No.: 12/116,339

(22) Filed: May 7, 2008

(65) Prior Publication Data

US 2009/0008235 A1 Jan. 8, 2009

Related U.S. Application Data

(60) Provisional application No. 60/947,588, filed on Jul. 2, 2007.

(51) Int. Cl.
*B01D 3/14* (2006.01)
(52) U.S. Cl.
USPC .............................. 203/39; 202/158
(58) Field of Classification Search ............. 203/39, 203/40, 41, 44, 47
See application file for complete search history.

(56) References Cited

U.S. PATENT DOCUMENTS

| | | | | |
|---|---|---|---|---|
| 4,168,211 A | * | 9/1979 | Pottharst, Jr. | 203/10 |
| 4,217,178 A | * | 8/1980 | Katzen et al. | 203/19 |
| 4,405,409 A | * | 9/1983 | Tusel et al. | 202/200 |
| 4,547,289 A | | 10/1985 | Okano et al. | |
| 4,624,784 A | * | 11/1986 | Lefebvre | 210/321.67 |
| 4,726,818 A | | 2/1988 | Yeung et al. | |
| 4,900,402 A | | 2/1990 | Kaschemekat et al. | |
| 4,978,430 A | * | 12/1990 | Nakagawa et al. | 203/14 |
| 4,980,066 A | | 12/1990 | Slegers | |
| 5,250,182 A | * | 10/1993 | Bento et al. | 210/641 |
| 5,439,701 A | * | 8/1995 | Zimlich, III | 426/624 |
| 5,449,440 A | | 9/1995 | Rescalli et al. | |
| 5,460,720 A | * | 10/1995 | Schneider | 210/321.86 |

(Continued)

FOREIGN PATENT DOCUMENTS

| CA | 2523009 A1 | 10/2005 |
|---|---|---|
| IN | 183868 | * 5/2000 |
| WO | WO 2005/113118 A2 | 12/2005 |

OTHER PUBLICATIONS

Nuortila-Jokinen, J., Kuparinen, A., Nystrom, M., "Tailoring an economical membrane process for internal purification in the paper industry", Desalination, vol. 110 pp. 11-19, Elsevier 1998.*

(Continued)

*Primary Examiner* — Robert A Hopkins
(74) *Attorney, Agent, or Firm* — Kilpatrick Townsend & Stockton LLP

(57) ABSTRACT

A system and process that are a hybrid of distillation and membrane separations offers a highly efficient means of separating a fluid feed mixture into organic, solid, and aqueous components. The distillation section is followed by two membrane separation sections operated in parallel, with the distillation section separating the feed mixture into an organics-rich fraction and an organics-depleted and solids-rich fraction. One membrane section operates on the organics-rich fraction and separates it into a more organics-rich sub-fraction and a water-rich, organics-depleted sub-fraction, while the other membrane section operates on the organics-depleted, solids-rich fraction from the distillation section and separates it into a solids-rich sub-fraction and a solids-depleted, water-rich sub-fraction.

41 Claims, 5 Drawing Sheets

U.S. PATENT DOCUMENTS

| | | | |
|---|---|---|---|
| 6,755,975 B2 | 6/2004 | Vane et al. | |
| 7,297,236 B1 | 11/2007 | Vander Griend | |
| 2003/0211585 A1* | 11/2003 | Gaddy et al. | 435/161 |
| 2004/0000521 A1 | 1/2004 | Vane et al. | |
| 2004/0115489 A1 | 6/2004 | Goel | |
| 2005/0031719 A1* | 2/2005 | Hoffman et al. | 424/780 |
| 2006/0070867 A1* | 4/2006 | Ikeda | 203/25 |
| 2006/0131235 A1* | 6/2006 | Offeman et al. | 210/640 |
| 2006/0251762 A1* | 11/2006 | Jansen et al. | 426/28 |
| 2007/0000769 A1* | 1/2007 | Brown | 203/19 |
| 2007/0031954 A1* | 2/2007 | Mairal et al. | 435/161 |
| 2007/0131533 A1 | 6/2007 | Blum et al. | |
| 2009/0057128 A1* | 3/2009 | Vane et al. | 203/17 |

OTHER PUBLICATIONS

Pettersen, T., Lien, K., "Design of hybrid vapor permeation processes", Journal of Membrane Science, vol. 99 pp. 21-30, Elsevier (c) 1995.*

Katzen, R., Madson P.W., and Moon, G.D., "Ethanol Distillation: The Fundamentals", The Alcohol Textbook, 3rd Edition, pp. 269-299, (c) 1999.*

Pettersen, T., Argo, A., Noble, R., Koval., C., "Design of combined membrane and distillation processes", Separations Technology, vol. 6, pp. 175-187, Elsevier © 1996.*

Baker, R., Cussler, E., Eykamp, W., Koros, W., Riley, R., Strathmann, H., "Membrane Separation Systems", © 1991 Noyes Data Corporation.*

Lee, T., Omstead, D., Lu, N., "Membrane separations in alcohol production" © 1981 NYAS.*

Fontalvo, J. et al, "Comparing Pervaporation and Vapor Permeation Hybrid Distillation Processes". Ind. Eng. Chem. Res., vol. 44, pp. 5259-5266, American Chemical Society © 2005.*

Lipnizki, F., Field, R., Ten., P. "Pervaporation-based hybrid process: a review of process design, applications, and economics", Journal of Membrane Science, vol. 153, pp. 183-210, Elsevier © 1999.*

O'brien, D., Roth, L., McAloon, A., "Ethanol production by continuous fermentation-pervaporation: a preliminary economic analysis", Journal of Membrane Science, vol. 166, pp. 105-111, Elsevier © 2000.*

Nataraj, S., Hosamani, K., Aminabhavi, T., "Distillery wastewater treatment by the membrane-based nanofiltration and reverse osmosis processes". Water Research, vol. 40, pp. 2349-2356, Elsevier © 2006.*

Wilf, I, Rappoport,S., "Operation of Hydranautics New ESNA Mmebrane as St. Lucie Wesr FL Softening Plant", <http://www.membranes.com/docs/papers/14_stluci.pdf> accessed Feb. 10, 2012.*

FILMTEC Membrane Technical Manual (Excerpt), Dow Chemical Company.*

Verhoef, Adrian, et al, "Simulation of hybrid pervaporation-distillation process", Computers and Chemical Engineering, vol. 32, pp. 1135-1146. Elsevier (c) 2008.*

El-Bourawi, M., Ding., Z., Ma., R., Khayet, M., "A framework for better understanding membrane distillation separation process", Jounral of Membrane Science, vol. 285 pp. 4-29, Elsevier (c) 2006.*

Cheryan, Munir, "Ultrafiltration and Microfiltration", pp. 382-385, $2^{nd}$ edition, CRC Press © 1998.*

* cited by examiner

MEMBRANE-BASED HYBRID PROCESS FOR SEPARATION OF MIXTURES OF ORGANICS, SOLIDS, AND WATER

CROSS-REFERENCE TO RELATED APPLICATION

This application claims the benefit of U.S. Provisional Patent Application No. 60/947,588, filed Jul. 2, 2007, the contents of which are incorporated herein by reference in their entirety.

BACKGROUND OF THE INVENTION

1. Field of the Invention

This invention lies in the field of phase separations of mixtures containing organic compounds, solids, and water. The invention relates in particular to processes involving distillation and membrane separations.

2. Description of the Prior Art

Fluid mixtures containing low boiling organics (LBOs), solids and water are generated in a variety of unit operations throughout the chemical and biotechnology industries. Examples of the industries that have unit operations where such mixtures may be generated are pharmaceuticals and biopharmaceuticals manufacturing, biofuels manufacturing, food, flavor and fragrance industries, intermediate chemicals and petrochemicals manufacturing, petrochemical refining, and natural gas suppliers. Reactors, extractors, precipitators, and crystallizers are examples of unit operations or processing steps that generate such mixtures. The reactors may be catalytic and non-catalytic and, in the catalytic reactors include those using chemical catalysts or biocatalysts for biochemical conversions such as fermentation.

Fermentation-based processes are increasingly used for the production of organics, including for example the production of ethanol and butanol from agro (starch- and sugar-based) feedstocks, cellulosic and lignocellulosic feedstocks; and industrial waste-based feedstocks such as cheese whey. Typically, the feedstocks are first treated to produce a necessary intermediate such as a fermentable carbohydrate (sugar) or bio-based syngas.

The fluid mixture produced by the fermentation of sugar intermediates contains at least one low-boiling organic substance in large concentrations, other organic substances in smaller concentrations, water, suspended solids and dissolved solids. The fermentation process also produces carbon dioxide. The low-boiling organics are produced in large concentrations and are usually the main product of the process and must be recovered and dried. The solids, however, are also a valuable by-product and likewise usually require concentration and drying. Both recovery and drying of the organics and concentration and drying of the solids are energy-intensive operations. With rising energy prices, there is a significant need for the development of novel energy-efficient approaches to achieve the desired separations.

The fermentation process described above is used for producing ethanol from sugar-based feedstocks such as cane molasses and from starch-based feedstocks such as corn. The use of ethanol for fuel blending is rapidly growing worldwide. Fuel-grade ethanol typically containing less than 0.5% water by weight is produced by multiple distillation steps using atmospheric distillation, vacuum distillation, or multi-pressure distillation to concentrate the ethanol to the azeotropic concentration followed by an azeotropic distillation or an adsorption step for recovery and drying of the ethanol. A solids-and-water stream is removed from the stripper column, which is the first distillation column in the distillation train.

In molasses-based plants the solids-and-water stream is usually called "spent wash," whereas in corn-based plants it is called "whole stillage." The spent wash and whole stillage streams are treated to recover both the solids and water which can be re-used. The spent wash stream can be used for ferti-irrigation after bio-gas generation, or it may be composted or evaporated. Evaporation is becoming increasing popular as a means of reducing the volume of the spent wash stream to reduce the land requirements for composting. The concentrated stream can also be used in a boiler as fuel, or incinerated or sold as condensed molasses solubles (CMS), which is useful as a cattle feed additive.

A whole stillage stream from a stripper column is typically treated and concentrated to produce either wet distillers grains (WDG), wet distillers grains and solubles (WDGS) containing up to 70% water by weight, distillers dried grains (DDG), or distillers dried grain and solubles (DDGS) containing up to 10% water by weight. The solids-water stream from the first distillation column (stripper) in the recovery of ethanol is typically directed to a centrifuge followed by evaporation for production of WDGS and an optional drying step for production of DDGS. International Patent Application Publication No. WO 2004/088230 A3, entitled "Ethanol Distillation With Distillers Soluble Solids Recovery Apparatus" (Brown, Thermal Kinetics Systems, LLC), publication date Oct. 14, 2004, discloses the conventional process for the production of ethanol with slight modifications.

For the drying of ethanol, the pressure swing adsorption process (PSA) has earned industry-wide acceptance and has virtually replaced azeotropic distillation all over the world due to its reduced energy consumption and its elimination of "entrainer" requirements. The PSA process typically uses two beds of Zeolite A molecular sieve beads in cyclic batch mode. In the adsorption cycle, the azeotropic mixture (95% ethanol-5% water) from the distillation column flows through Bed 1 and anhydrous alcohol is produced. A fraction of the product flows as purge through Bed 2 that is in a regeneration cycle. As a result, the regenerant stream contains about 60-80% alcohol that must be recycled to the rectifier and re-distilled to the azeotropic concentration for recovery.

Vander Griend U.S. Pat. No. 7,297,236, issued Nov. 20, 2007 discloses an integrated process for both organic-water separation and solid-liquid separation using conventional technologies. The process uses an energy-intensive multi-distillation step, combined with a molecular sieve step for ethanol recovery and an energy-intensive evaporation step for solids concentration.

Membrane separations are used in the chemical industry for a broad range of applications. Separations known as "Molecular Dehydration (Organic Dehydration)" and "Solid-Liquid" separations are examples of such applications.

Membrane-based processes for molecular dehydration are highly energy-efficient, environment friendly, easy to integrate into existing plants and to operate, and have reduced maintenance requirements compared to conventional distillation and adsorption-based processes. The separation in a membrane-based process is based on the difference in partial pressure (chemical potential) between the feed side and permeate side of the membrane and not on the relative volatility. The use of entrainer chemicals, therefore, is not required for breaking azeotropes. Moreover, there are no regeneration requirements since the membranes do not get saturated as do adsorbent beads. Membranes thus perform dehydration in a simple, non-cyclic continuous process. Energy efficiency is also achieved in membrane-based solid-liquid separations, since the separation (by concentration of solids) is based on a pressure differential between the feed side and the permeate side, without requiring the evaporation of liquids. Membrane-based systems also offer a smaller footprint than evaporator systems.

Examples of prior art disclosures of membrane-based processes for the treatment of organic-water mixtures and solid-liquid mixtures are Kaschemekat et al. (Kernforschungszentrum Karlsruhe GmbH) U.S. Pat. No. 4,900,402, issued Feb. 13, 1990, and Vane et al. (Membrane Technology and Research Inc.) U.S. Pat. No. 6,755,975, issued Jun. 29, 2004. These patents disclose membrane-distillation and dephlegmation-based processes for the separation of liquids. Both references are silent however on the treatment of solids and both assume that the feed to the distillation/dephlegmation step is solids-free. Dijkstra et al. (GKSS-Forschungszentrum Geesthacht GmbH), in German Patent No. DE 103 33 049 B3, granted Nov. 25, 2004, disclose an energy-efficient membrane-molecular sieve adsorption process integrated with distillation. This reference also ignores the problem of solids separation and concentration, however.

International Patent Application Publication No. WO 2005/113118 A3, entitled "Fuel And By-Products From Fermentation Still Bottoms" (Ahring et al.), publication date Dec. 1, 2005, and its United States counterpart U.S. Pat. No. 7,267,774 B2 (Peyton et al., NouvEau, Inc.), issued Sep. 11, 2007) disclose an energy-efficient membrane-based solid-water separation process for the concentration and treatment of dissolved and suspended solids from the bottoms of distillation columns. This reference is silent on the recovery of organics.

Canadian Patent Application No. CA 2 523 099 to Kaiser et al. (BUSS-SMS-CANZLER GmbH, published Nov. 11, 2004) and its published United States counterpart US 2007/0131533 A1 (Blum et al., published Jun. 14, 2007) address issues related to both ethanol recovery and solids concentration. The membrane in this reference is used for the drying of ethanol, but the reference is silent on the treatment of the bottom stream of the distillation column. The reference does however disclose a solid-liquid membrane-based treatment for processing the feed mixture from the fermentor, which consists of ethanol, water and solids.

Mairal et al. United States Patent Publication No. 2007/0031954 A1, publication date Feb. 8, 2007, also addresses issues related to ethanol recovery and solids concentration in the same application. The membrane process in this reference is used for organic dehydration, and a solid-liquid membrane-based treatment is used for processing a mixture of ethanol, water and solids from the fermentor. The reference is likewise silent on the recovery of ethanol from the discharge stream from the solids removal step.

It is clear from the patent literature that attempts are being made to improve the current processes for the treatment of fluid mixtures containing low-boiling organics, water and solids. None of the patents or patent applications, however, disclose an integrated energy-efficient process that simultaneously provides both organic-water separation and solid-liquid separation. The current invention solves this key problem and provides a novel process and system that separates low-boiling organics, solids and water from a fluid mixture in a highly energy-efficient and cost-effective manner.

SUMMARY OF THE INVENTION AND DEFINITIONS

This invention resides in a process and system for separating a fluid mixture that contains at least one low-boiling organic ("LBO"), solids, and water, using a hybrid of distillation and membrane separations. A distillation section is used in conjunction with two concurrent membrane separation sections to produce a first stream rich in organics, a second stream depleted of organics and rich in water, a third stream rich in solids, and a fourth stream depleted of solids and rich in water. When the LBO forms a minimum boiling point azeotrope with water, the present invention is directed to feed fluid mixtures in which the normalized LBO concentration, after adjusting for solids, is below the azeotropic LBO concentration.

The term "low boiling organic(s)," abbreviated herein as "LBO(s)," is used herein to denote organic materials, compounds and substances that have normal boiling points above 65° F. (approximately 18° C.). For those LBOs whose normal boiling points are also below the normal boiling point of water, the invention is directed to those that do not form a maximum boiling azeotrope with water, whereas for those LBOs whose normal boiling points are above the normal boiling point of water, the invention is directed to those that form a minimum boiling azeotrope with water.

The term "solids" is used herein to denote a material, compound or substance, suspended or dissolved, that is non-volatile (i.e., not vaporizable) or that has a normal boiling point above 600° F. (approximately 315° C.).

The feed fluid mixtures, also referred to as "feed mixtures," to which this invention is directed are mixtures that contain at least one LBO, at least one solid substance, and water. Mixtures that further contain high-boiling organic materials (those that are not covered by the definition of LBO(s) above), gases, or both, are also included with the scope of feed fluid mixtures.

DETAILED DESCRIPTION OF THE INVENTION AND PREFERRED EMBODIMENTS

Figure 1:
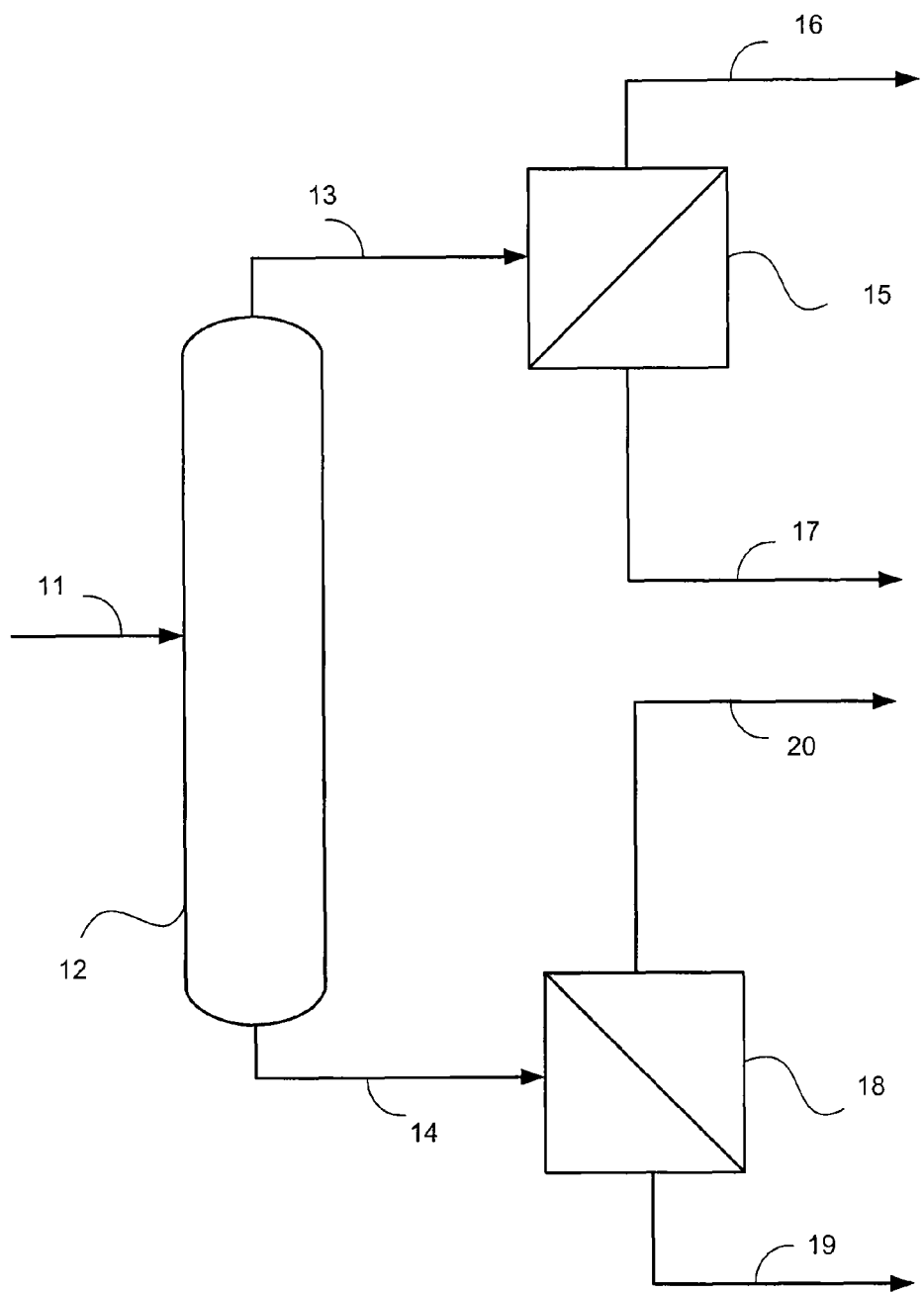
FIG. 1 is a schematic drawing of the main sections of the process and system of the invention.

FIG. 1 is a schematic drawing of the process of the invention in its most basic form. The fluid mixture stream 11 originating from an upstream source is introduced into a distillation column 12. The distillation column splits the fluid stream 11 into an overhead stream 13 that is LBO-rich and bottom stream 14 that is rich in solids and depleted of LBOs. These two streams 13, 14 emerging from the distillation section are treated concurrently in two distinct membrane separation sections.

The LBO-rich stream 13 is introduced into the first membrane separation section 15. The membrane used in this section is specifically selected as one that is capable of concentrating the LBO and thereby separating the distillation column overhead stream into a water-depleted or dry LBO stream 16 and water-rich stream 17. The LBO-depleted, solids-rich stream 14 is introduced into the second membrane separation section 18. The membrane used in this section is specifically selected as one that is capable of concentrating the solids and thereby separating the distillation column bottoms stream 14 into a water-depleted, solids-rich stream 19 and a water-rich stream 20.

Treatment of LBO—water and solids—water streams in two concurrent membrane separation sections downstream of the distillation section unexpectedly results in an overall integrated process that is highly energy efficient. If an energy-efficient membrane step is applied for treatment of only one of the two streams in the treatment of a fluid mixture containing LBO, solids and water, any savings in energy will be negligible or minor because the conventional processes being used are energy-balanced to minimize energy usage. There is therefore little merit in applying an energy-efficient process for only one step, since there is little or no use for the excess (saved) energy. Savings of any significance will only be realized if the process has poor energy integration. The simultaneous use of the two energy-efficient membrane sections is therefore essential for achieving energy savings of any significance.

The process of the present invention is flexible and can treat fluid mixtures with a wide range of compositions and types of organic substances and solids in water. Fluid mixtures from a wide range of industries and a variety of unit operations, such as reactors, extractors, precipitators and crystallizers, can be treated by the process of this invention. Examples of organics that can be concentrated are alcohols, organic acids, esters, ketones, aldehydes, ethers, hemiacetals, acetals, amines, nitriles, mercaptans, aliphatic and aromatic hydrocarbons and chlorinated hydrocarbons. Among alcohols, preferred organics are $C_1$-$C_4$ alcohols. Solids that can be concentrated by the process include dissolved solids and suspended solids. Among solids, dissolved solids are preferred. The solids may be crystalline, amorphous, or combinations of crystalline and amorphous solids. The solids may be ionic, covalent, molecular (polar or non polar) or metallic. The preferred particle size of the solids extends from the ionic range (1 to 100 Å) to the fine particle range (10 to 100 microns). In addition, heavy liquids, defined herein as substances that are liquids with negligible vapor pressures at room temperature (22° C.) and that have normal boiling points above 600° F. (316° C.), when present in the mixture will be retained with the solids. Examples of solids and heavy liquids that can be separated from LBO and water in the practice of this invention are cellular matter, fats, oils, synthetic polymers, natural polymers (an example of which is lignin), biopolymers (examples of which are proteins and nucleic acids), carbohydrates (both simple and complex, including mono-, di-, oligo- and polysaccharides), fiber, chemical catalysts and biocatalysts, nutrients, metals, ash, and inorganic salts. Additionally, high-boiling organic compounds such as glycols and amides and gases such as carbon dioxide can also be present in the feed fluid mixture.

The feed mixture in the practice of the present invention can be supplied to the process at flow rates in the range from about 1 GPH (3.8 LPH) to about 100,000 GPM (378,540 LPM) and preferably from about 10 GPH (37.9 LPH) to about 10,000 GPM (37,854 LPM) (GPH: gallons per hour; LPH: liters per hour; GPM: gallons per minute; LPM: liters per minute). The feed mixture preferably contains LBO within the range of about 1% to about 90%, more preferably from about 3% to about 75%, and most preferably from about 5% to about 50%, all by weight. The solids composition of the feed mixture is preferably from about 0.1% to about 40%, more preferably from about 0.1% to about 30%, and most preferably from about 0.1% to about 20%. All percents in this specification are by weight unless otherwise indicated.

Distillation Section

The distillation section essentially concentrates the LBOs while separating the LBOs from the solids. The term "LBO-rich" is used herein to denote a stream that contains an LBO concentration that is higher than the LBO concentration in the feed mixture to a degree that renders the process commercially useful. In preferred embodiments of the invention, the LBO-rich stream from the distillation unit contains LBO within the range of about 15% to about 99.5%, more preferably from about 30% to about 99.5%, and most preferably from about 50% to about 99.5%. Likewise, the terms "solids-rich" or "rich in solids" are used herein to denote a stream that contains a solids content that is higher than the solids content of the feed mixture to a degree that renders the process commercially useful in either solids recovery or solids removal. In preferred embodiments, the solids-rich stream from the distillation unit has a solids content within the range of about 0.2% to about 50%, more preferably from about 0.2% to about 40%, and most preferably from about 0.2% to about 30%.

Distillation columns suitable for use in the practice of this invention are plate (tray) columns, froth columns, and packed columns. Columns that contain combinations of packing and plates can also be used. Plate columns and froth columns are preferred distillation columns. In plate columns, preferred trays are fouling-resistant trays such sieve trays, baffle trays, disc and donut trays, dual flow trays, cartridge trays, bubble-cap trays or tunnel-cap trays and some designs of the valve trays such as the PROVALVE® tray by Koch-Glitsch LP, Wichita Kans., USA. An example of an industrial-scale froth column for use in this invention is DYNAWAVE® supplied by MECS Inc., St. Louis, Mo., USA. The distillation column can be operated at atmospheric pressure, at sub-atmospheric pressure, or at a pressure above atmospheric preferably in the range from about 0.1 psia (0.7 KPa) to about 250 psig (1,825 KPa) and corresponding temperatures from about 50° F. (10° C.) to about 500° F.(260° C.). When operating at a sub-atmospheric pressure, preferred operating pressures are from 0.1 psia (0.7 KPa) to 14 psia (96.5 KPa). The corresponding operating temperatures are typically in the range from 50° F. (10° C.) to 350° F. (177° C.). When operating at atmospheric pressure or above, preferred operating pressures are from 0.1 psig (102 KPa) to 250 psig (1,825 KPa) and more preferred operating pressures are from about 5 psig (136 KPa) to about 150 psig (1,136 KPa). The corresponding preferred operating temperatures are from 65° F. (18° C.) to 500° F. (260° C.) and the more preferred temperatures are from 80° F. (27° C.) to about 450° F. (232° C.). The use of reflux is optional. The heat to the distillation column can be provided by direct steam injection or by indirect heating in a reboiler. The column can be operated in a batch-wise manner or a continuous manner. There can be one or more feed streams to the distillation column and one or more side draws from the distillation column. The distillation section can contain a single distillation column or multiple columns, particularly where height restrictions are present or where multiple columns can offer enhanced energy integration. The terms "distillation unit" and "distillation section" are used herein to cover both single and multiple columns. The LBO-rich stream is recovered as the overhead stream from the distillation unit and the solids-rich stream is recovered as the bottoms stream.

The distillation section of the process of the present invention can be preceded by any of a variety of unit operations.

Examples are a filtration step for reduction of solids, a membrane separation step for reduction of solids and/or organics, a scrubber for reduction of gas, a membrane-based degasification step for reduction of gas, and a heat exchanger for heating or cooling of the fluid mixture.

First Membrane Separation Section

The overhead stream from the distillation section flows into the first membrane separation section for separation of the LBO and water from each other. This incoming stream to the first membrane separation section preferably contains solids in the range from 0 to about 0.5%, more preferably from 0 to 0.05%, and can be liquid-phase or vapor-phase. When the stream is liquid, the preferred mode of operation is the pervaporation (PV) mode, while for a vapor-phase feed, the preferred mode of operation is the vapor permeation (VP) mode. Alternatively, VP can be used for a liquid feed stream, and PV for a vapor feed stream, after appropriate heat exchange steps. The driving force for both PV and VP can be obtained by maintaining the permeate side of the membrane under vacuum preferably in the range from about 0.01 psia (0.07 KPa) to about 10 psia (69 KPa), or by purging the permeate side with a gas stream, or by using a combination of vacuum and a purge stream. The optimal process mode and operating conditions will vary with such factors as the water concentration in the feed stream and the desired water content in the concentrated LBO stream. Feed pressures to the first membrane separation unit are preferably in the range from 5 psig (136 KPa) to 250 psig (1,825 KPa), and more preferably from about 5 psig (136 KPa) to about 150 psig (1,136 KPa). The corresponding temperatures are preferably in the range from 65° F. (18° C.) to 500° F. (260° C.), and more preferably from about 80° F. (27° C.) to about 450° F. (232° C.).

The membrane in the first membrane separation section preferably has at least one ultramicroporous or dense selective layer capable of concentrating LBOs. Suitable membranes for both PV and VP modes are those that are capable of permeating water selectively over LBOs. Preferred membranes have a Water Permeation Flux of about 50 GPU or greater (where GPU denotes "gas permeation unit" and 1 GPU=$3.347\times10^{-10}$ mol/m$^2\cdot$s$\cdot$Pa), more preferably about 50 GPU to about 25,000 GPU, still more preferably from about 100 GPU to about 20,000 GPU, and most preferably about 200 GPU to about 15,000 GPU. The selectivity (Water Permeation Flux divided by LBO Permeation Flux) of the preferred membrane for water permeation over the LBOs is preferably of about 25 or greater, more preferably from about 25 to about 100,000, still more preferably from about 50 to about 25,000, and most preferably from about 100 to about 10,000, to minimize the membrane area and leakage of the LBOs into the permeate stream.

The selective layer of the membrane can be an organic membrane, an inorganic membrane, or mixed-matrix membranes. Preferred membranes for this layer are organic membranes made from glassy polymers and inorganic membranes made from zeolites or silica. Among organic membranes, those that are particularly preferred are polymeric membranes made from glassy polymers and ion-exchange polymers. Blended polymers, homopolymers, or co-polymers can be used, as can polymers that have been modified by changes in physical structure (such as the degree of crystallinity) or in chemical structure (by substitution of chemical groups), and polymers that have been modified by the addition of cross-linking agents or plasticizers and the like to improve their properties. The most preferred are glassy polymers having a glass transition temperature Tg of about 90° C. or higher, including those in the range of about 90° C. to about 150° C., and those in the range of about 150° C. to 350° C. The term "glassy" is used herein to denote that the membranes are used in their glassy state, well below their softening or glass transition temperature Tg. Examples of glassy polymers for use as the selective layer include, but are not limited to, polyvinyl alcohol, polyamides, polycarbonates, polyetherimides, polysulfones, polyethersulfones, polyimides, polyamideimides, poly(phenylene oxides), polyacetylenes such as poly(1-trimethylsilyl-1-propyne) (PTMSP), and the like. Aromatic polycarbonates, aromatic polyetherimides, aromatic polyimides, aromatic polyamides (polyaramids), and aromatic polyamideimides are more preferred. Among inorganic membranes, zeolite membranes made from hydrophilic (with low silica-alumina ratios) zeolites such as A-, X- and Y-type zeolites are preferred.

Both isotropic and anisotropic membranes can be used, although anisotropic membranes are preferred. The anisotropic membranes may be integrally skinned or composite (dual layer or multilayer). When anisotropic membranes are used, a support layer can be included to serve as a mechanical support for the selective layer. Appropriate support layers are highly permeable to minimize resistance to permeation, and are thermally and chemically resistant to the streams to which the membrane is exposed during use. The support layer itself can be isotropic or anisotropic and can be made from organic or inorganic materials.

The most preferred membranes are integrally skinned polymeric membranes made from glassy polymers and composite inorganic membranes comprised of a zeolite film on a porous ceramic substrate. The membrane can be a hollow-fiber, tubular, monolithic or flat-sheet membrane, and can be packaged in a hollow-fiber module, tubular module, monolithic module, plate-and-frame module, disk-tube module or spiral-wound module. Preferred membranes are integrally skinned hollow-fiber glassy membranes packaged into a hollow-fiber module, composite tubular zeolite membranes packaged into a tubular module, and composite monolithic zeolite membranes packaged into a monolithic membrane module. The efficiency of the separation will vary with the selection of the membrane module and the conditions under which it is used. The membrane module is preferably constructed and operated in such a manner that the pressure drop on the permeate side when maintained under vacuum is minimal.

Examples of suppliers of inorganic membranes suitable for use in the first membrane section are Mitsui Engineering & Shipbuilding of Japan, Sulzer Chemtech Membrane Systems of Heinitz, Germany, and Pervatech BV of Enter, Netherlands. Examples of suppliers of polymeric membranes suitable for use in the first membrane section are Sulzer Chemtech GmbH of Neunkirchen, Germany, and Bend Research, Inc. of Bend, Oreg., USA (for hollow-fiber polyamide-based membranes).

As noted above, the first membrane section can include several membrane modules connected in multiple stages and passes, and each stage or pass can contain an array of membrane modules in series or in parallel to accomplish the desired separation. Each membrane module can be identical, or different modules can be constructed from different types of membranes.

Any of a variety of units or operations can be incorporated between the distillation section and the first membrane separation section. A heat exchanger, for example, can be incorporated for such purposes as condensation of the column overhead vapor, vaporization of the condensed liquid, or sensible heating or cooling. A vapor compression step can be inserted for compression of the vapor from the distillation section. When a vapor compression step is inserted, preferred operating pressures of the distillation section are from about 5 psia (34 KPa) to about 50 psig (446 KPa) and preferred temperatures are from about 50° F. (10° C.) to about 400° F. (204° C.). Correspondingly, the vapor compressor compresses the vapor from distillation section to a pressure preferably from about 5 psig (136 KPa) to about 150 psig (1,136 KPa). A filtration step can be included for removal of entrained solids when the feed to the membrane is in the liquid phase. When the feed to the first membrane is in the vapor phase, a filtration step can be used for removal of entrained solids and liquids, such as, for example, a mist eliminator for removal of soluble solids including submicron particles, organic mist, and water mist. Another example is a degasification step for the removal of gases. Yet another example is a scrubber or membrane-based degasifier for degasification. Yet another example is a phase separation step, such as, for example, a decanter for separation of immiscible liquids. The first membrane separation section can also be preceded by a LBO concentration or purification step. Examples of such steps are: an additional (preliminary) membrane separation step (operated in the same or a different process mode as the first membrane), an adsorption step, a liquid-liquid extraction step, a perstraction step, a membrane-based solvent extraction step, and a salt drying step.

The first membrane separation section will separate the LBO-rich stream, after a pre-treatment step, if included, and the separation will produce two streams—a LBO-rich stream and a LBO-depleted (water-rich) stream. In a manner analogous to its use in the distillation section, the term "LBO-rich" when used in connection with one of the streams emerging from the first membrane separation section denotes a stream that contains an LBO concentration that is higher than the LBO concentration in the incoming stream to the section, to a degree that renders the process commercially useful. In preferred embodiments of the invention, the LBO-rich stream from the first membrane separation section contains LBO within the range of about 25% to about 99.99%, more preferably from about 45% to about 99.95%, and most preferably from about 60% to about 99.9%.

The LBO-rich stream from the first membrane separation section can be further treated in a LBO concentration or purification step. Examples of such steps are: an additional membrane separation step (operated in the same or a different process mode as the first membrane separation step), an adsorption step, a distillation step, a liquid-liquid extraction step, a perstraction step, a membrane-based solvent extraction step, and a salt-drying step. If an adsorption step is used, the adsorbent can be an organic, inorganic, or mixed-matrix adsorbent. The adsorption step can be operated in a non-regenerative or regenerative mode. If a regenerative mode is used, the system can be operated in a pressure swing adsorption (PSA) mode or a temperature swing adsorption (TSA) mode. The concentrated LBO resulting from the adsorption step can be sold directly or blended with other materials for sale. The regenerant stream from the adsorption step can be treated elsewhere in the process. The regenerant stream is preferably recycled to the distillation column section for LBO recovery.

The terms "LBO-depleted" and "water-rich" when used to describe the remaining stream emerging from the first membrane separation section denotes a stream that contains an LBO concentration that is lower, and the water content higher, than in the incoming stream to the section, to a degree that renders the process commercially useful. In preferred embodiments of the invention, the LBO-depleted, water-rich stream from the first membrane separation section contains LBO within the range of about 0.01% to about 95%, more preferably from about 0.01% to about 80%, and most preferably from about 0.01% to about 50%.

The LBO-depleted (aqueous) stream can be further treated in a LBO recovery and removal step. Examples of such steps are: an additional membrane separation step, a distillation and dephlegmation step, an air or steam stripping step, a carbon adsorption step, a biological treatment step, and a chemical oxidation step. Examples of additional membrane separation steps are pervaporation (PV) and reverse osmosis (RO). When pervaporation is used, the preferred membrane is one that will selectively permeate the LBO over water. Water resulting from the first membrane separation section, after subsequent treatment if any, can be recycled to the distillation section, recycled elsewhere in the process, used for cooling tower or boiler-make up, or discharged to surface water or sewer.

A heat exchanger can be incorporated downstream of the first membrane separation section and will be particularly useful when condensation or sub-cooling of the LBO-rich stream are desired.

Second Membrane Separation Section

The bottoms stream from the distillation section flows into the second membrane separation section for separation of solids and water from each other. The stream entering the second membrane separation section preferably contains LBOs in the range from 0 to about 5%, more preferably from 0 to 0.5%.

The feed to the second membrane separation section is in the liquid phase. Depending on the type of solids being removed, the concentration of solids in the water, and the desired degree of solids concentration, the second membrane separation section can be operated in microfiltration (MF), ultrafiltration (UF), nanofiltration (NF), or reverse osmosis (RO) modes. The optimal membrane material, pore size, morphology, module configuration and process operating conditions will vary with the filtration mode. Selection of a mode and operating conditions will be made in consideration of the characteristics of the feed stream and of the desired separation. For all such modes, preferred operating pressures are from about 5 psig (about 136 KPa) to about 2500 psig (about 17,338 KPa) and more preferred operating pressures are from about 15 psig (205 KPa) to about 2000 psig (13,891 KPa). The corresponding operating temperatures are from about 50° F. (10° C.) to about 500° F. (260° C.) and more preferred temperatures are from about 50° F. (10° C.) to about 300° F. (149° C.).

The membrane(s) selected for the second membrane separation section preferably have at least one porous, ultramicroporous, or dense selective layer capable of concentrating solids. Preferred membranes for either of the MF, UF, NF and RO modes are those that are capable of permeating water selectively over solids, and have a Membrane Constant (Water Flux/Transmembrane Pressure Drop) preferably about 0.001 GFD/psi (gallons/ft$^2$ day/psi) or greater, more preferably from about 0.001 GFD/psi to about 10 GFD/psi, still more preferably from about 0.005 GFD/psi to about 7 GFD/psi, and most preferably from about 0.01 GFD/psi to about 5 GFD/psi. The Rejection Coefficient of the preferred membrane for selected solids is preferably about 30% or greater, more preferably from about 30% to about 99.99%, still more preferably from about 50% to about 99.99%, and most preferably from about 65% to about 99.99%, to minimize the membrane area and leakage of the selected solids into the permeate stream. The solids-rich stream from the distillation section to the second membrane separation section may contain a combination of solids including those solids that need to be rejected, i.e., selected solids, and those that can permeate. The Rejection Coefficient criterion is applicable only to the selected solids that need to be retained by the second membrane. Membranes that reject certain selected solids and permeate other solids and have lower or no Rejection Coefficient for such other or undesired solids can also be used.

Still further operating modes for membranes in the second membrane separation unit, to be used in as alternatives to or in addition to membranes operating in MF, UF, NF or RO modes, are membrane distillation (MD) and electrodialysis (ED) modes. A membrane operating in MD mode is useful, for example, on feed streams where the concentration of dissolved solids is too high for a practical operation of an RO membrane. Membranes operating in Electrodialysis (ED) or Electrodialysis Reversal (EDR) modes are effective for concentrating ionized solids.

The selective layer of the membrane(s) in the second membrane separation section can be either an organic membrane, an inorganic membrane, or a mixed-matrix membrane. Among organic membranes, those made from polymers are preferred, and among inorganic membranes, those made from ceramics are preferred. Polymeric membranes can be made of polymer blends, homopolymers, or co-polymers, or polymers modified by changes in physical structure (such as by changing the degree of crystallinity), or polymers modified by changes in chemical structure (such as by the substitution of chemical groups), or polymers modified by the addition of cross-linking agents, plasticizers, or other common polymer additives to improve their properties. The membrane can be charged or neutral. Preferably, the selective layer has surface characteristics that reduce the tendency of the membrane to foul.

The membrane can be selected to meet the feed specifications and to achieve the desired separation and operating conditions. For microfiltration applications, the membranes can be organic or inorganic. Examples of organic membranes that can be used are polysulfones, polypropylenes, nylon 6, nylon 66, poly(tetrafluoroethylene)s, poly(vinylidene fluoride)s, cellulose acetate, cellulose nitrate, polyesters, polycarbonates, and polyimides. Examples of inorganic membranes that can be used are metal membranes. For ultrafiltration applications, the membranes can likewise be either organic or inorganic. Examples of organic membranes are polysulfones, poly(ethersulfone)s, cellulose acetate, regenerated celluloses, polyamides, poly(vinylidene fluoride)s, and polyacrylonitriles. Examples of inorganic membranes are γ-alumina/α-alumina, borosilicate glass, pyrolyzed carbon, zirconia/SS, and zirconia/carbon. For nanofiltration and reverse osmosis, the preferred membranes are organic membranes. Examples are cellulose acetate, cellulose diacetate and triacetate, cellulose acetate butyrate, aromatic polyamides, cross-linked aromatic polyamides, poly(vinyl alcohol) (TFC), aryl-alkyl polyamides/polyurea, and cross-linked polyethylenimines. Certain inorganic membranes such as zeolites may be operated in nanofiltration or reverse osmosis mode as well. For membrane distillation applications, the membranes can be either organic or inorganic. Examples of organic membranes are polysulfones, polypropylenes, nylon 6, nylon 66, poly(tetrafluoroethylene)s, poly(vinylidene fluoride)s, cellulose acetate, cellulose nitrate, polyesters, polycarbonates, and polyimides. Examples of inorganic membranes are metal membranes. For electrodialysis (ED), the preferred membranes are ion-exchange membranes. Examples of ion-exchange membrane matrices are polystyrenes, polyethylenes, and polysulfones.

Both isotropic and anisotropic membranes can be used in the second membrane separation section. The anisotropic membranes can be integrally skinned or composite (dual-layer or multilayer). When anisotropic membranes are used, a support layer can be included to serve as a mechanical support for the selective layer. Appropriate support layers are those that are highly permeable to minimize resistance to permeation, and thermally and chemically resistant to the streams to which the membrane is exposed during use. The support layer itself may be isotropic or anisotropic and may be made from organic or inorganic materials.

The membrane(s) in this second membrane separation section can be hollow-fiber, tubular, monolithic, or flat-sheet, and can be packaged in a hollow-fiber module, a tubular module, a monolithic module, a plate-and-frame module, a disk-tube module, or a spiral-wound module. Preferred modules are those with open-channel construction such as tubular modules, monolithic modules, plate-and-frame modules, and disk-tube modules. The fluid flow in the module can be dead-ended, cross-flow or shear-enhanced. Dead-ended flow systems are preferably used only in feed fluid mixtures with low concentrations of solids or in situations where the extent of solids concentration (recovery) is extremely low. Cross-flow and shear-enhanced filtration are preferred modes of operation. In cross-flow filtration, open channels and spacer-filled channels can be used. The channels can be straight or curved. In general, however, open straight-channel cross-flow systems are preferred. Shear may be enhanced to improve the hydrodynamics by using turbulent flow, by introducing inserts in the fluid path such as turbulence promoters, or by introducing instabilities by use of pulsation, rough surfaces, or vortices (Couette Flow or Dean's vortices). Shear can also be enhanced by using dynamic cross-flow filtration (such as by rotation of the membrane, rotation of a mechanical device attached to the membrane, or alternating rotational and stationary devices), or by oscillation of the membrane to generate vibrational energy at the membrane surface. Additionally, to minimize fouling, the second membrane separation section can be operated in a manner allowing back-washing and cleaning. Backwashing and cleaning can be performed with water or cleaning chemicals. With appropriate selection of the membrane and operating conditions, efficient separation, including the minimization of fouling on the feed side of the membrane, can be achieved.

A variety of solid-liquid separation systems suitable for use in this second membrane separation section are available commercially. Examples are VSEP® by New Logic Research Inc., Emeryville, Calif., USA; Filtration Systems by Rochem Separation Systems (India) Pvt. Ltd., Mumbai, India; Dynamic Cross Flow Filtration by Buss-SMS-Canzler GmbH, Germany; CR-FILTER® by Metso Paper, Finland; Filtration Products by Graver Technologies, Glasgow, Del., USA; and PALL DISC TUBE™ Module by Pall Corporation, East Hills, N.Y., USA.

The second membrane separation section can contain several membrane modules connected in multiple stages and passes, and each stage or pass can contain an array of membrane modules in series and parallel to accomplish the desired separation. Each membrane module can be identical, or when multiple modules are included, different modules can be constructed from different types of membranes.

The second membrane separation section can be preceded by any of a variety of units and operations. Examples are chemical treatment steps such as those for pH adjustment, and treatments with a surfactant or chelating agent for a variety of objectives such as increasing the particle size of the solids and reducing the tendency of the stream to foul. Another example is a heat exchanger for either sensible heating or cooling. A further example is a pre-filtration step for removal of suspended solids, optionally including one of the following—centrifugation, hydrocyclone or cyclone, coagulation, flocculation, dissolved or dispersed air flotation, chemical oxidation, biological treatment such as anaerobic digestion and aerobic treatment. The pre-filtration step can also include a membrane operating in a microfiltration process mode. Further alternatives for a pre-filtration step are a conventional filtration step using diatomaceous earth filtration, dual-media filtration, sand filtration, micro-screening, vibratory screening, filter press, precoating, and basket and bag filtration. The second membrane separation section can also be preceded by a solids concentration or purification step, for example an additional membrane separation step (operated in the same process mode as the second membrane separation unit or in a different process mode).

The second membrane separation section will separate the solids-rich stream from the distillation section, after a pretreatment step, if included, and the separation will produce two streams—a solids-rich stream and a solids-depleted stream. In a manner analogous to its use in the distillation section, the term "solids-rich" when used in connection with one of the same streams emerging from the second membrane separation section denotes a stream that contains a solids concentration that is higher than the solids concentration in the incoming stream to the section, to a degree that renders the process commercially useful. In preferred embodiments of the invention, the solids-rich stream from the second membrane separation section contains solids within the range of about 0.5% to about 60%, more preferably from about 0.5% to about 50%, and most preferably from about 0.5% to about 40%.

The solids-rich stream from the second membrane separation section can be further treated in a solids concentration or purification step. Examples of solids concentration and purification steps are an additional membrane separation step (operated in the same process mode as the second membrane separation unit or in a different process mode), a filter press, a centrifuge, an evaporator, and a dryer. The evaporator can employ several stages of evaporation. Examples of types of evaporators that can be used are falling-film, rising-film, and forced-circulation evaporators. Mechanical or thermal vapor recompression can be used for additional energy integration. Various types of dryers such as rotary kiln and ring dryers can be used. After concentration, the solids can be recovered and sold as cattle feed or any other suitable product, used as fuel in a boiler, composted, applied to landfill, or incinerated.

The terms "solids-depleted" and "water-rich" when used to describe the remaining stream emerging from the second membrane separation section denotes a stream that contains a solids concentration that is lower, and water content higher, than in the incoming stream to the section, to a degree that renders the process commercially useful. In preferred embodiments of the invention, the solids-depleted, water-rich stream from the second membrane separation section contains solids within the range of about 0.0001% to about 40%, more preferably from about 0.0005% to about 30%, and most preferably from about 0.001% to about 20%.

The solids-depleted (aqueous) stream can be further treated in an additional solids recovery and removal step. Examples are an additional membrane separation step (operated in the same mode as the second membrane separation step or a different mode), a biological treatment step, a chemical oxidation step, a chemical precipitation step, a chemical reduction step, a coagulation step, a carbon adsorption step, and an ion-exchanger. The water can be recycled to locations elsewhere in the plant for reuse, such as make-up water in a boiler or cooling water. The water can also be discharged to surface water or a sewer. Either of the two streams emerging from the second membrane separation section can be heated or cooled by a heat exchanger.

The pre-treatments and post-treatments for both the distillation and membrane sections can be used individually or in combinations.

The present invention has numerous applications. Any production facility that generates a mixture of LBOs, solids and water that will benefit from separation is a potential application for the present invention. One area of technology in which the invention is of use is the production of biofuels such bioethanol and biobutanol using fermentation of agri (starch- and sugar-based), cellulosic and lignocellulosic feedstocks, or industrial waste-based feedstocks. Treatment of some of the feedstocks in processes such as liquefaction, saccharification, acid hydrolysis, enzymatic hydrolysis, and gasification may be required for conversion of the feedstock to an intermediate suitable for fermentation. The fermentation can be performed using yeast, bacteria or a genetically modified organism. The cells used can be mobilized or immobilized. The fermentor can be operated in a batch, fed-batch, semi-continuous or continuous mode. The fermentation can be carried out in the liquid phase (submerged fermentation) or the solid phase. A variety of designs for the industrial scale fermentors can be used. A detailed description of fermentation modes of industrial interest and types of fermentor (bioreactor) designs is included in *The Biotechnology of Ethanol, Classical and Future Applications*, edited by M. Roeher, Part II, Sections 5 and 6, Wiley VCH, 2001.

In the production of bioethanol from corn, for example, a fluid mixture containing organics (predominantly ethanol and other volatile impurities such as fuel oils, methanol, organic acids, aldehydes, ketones, esters, ethers, hemiacetals and acetals), solids (such as fats, fiber, proteins, carbohydrates and ash), water, and carbon dioxide is treated in the distillation, dehydration, and evaporation sections of the ethanol plant. The distillation section consists of series of distillation columns. The dehydration section consists of a molecular-sieve-based pressure swing adsorption system for drying of LBO (ethanol), and the evaporation section consists of series of evaporators for concentration of the solids. Usually, the evaporators are preceded by a centrifuge for removal of suspended solids. In an existing plant, the process of the invention can be applied by incorporation of the first membrane separation section ahead of the PSA system and the second membrane separation section ahead of the evaporators. The PSA system and the evaporators can be replaced entirely by a system incorporating the present invention.

FIGURES

Figure 3:
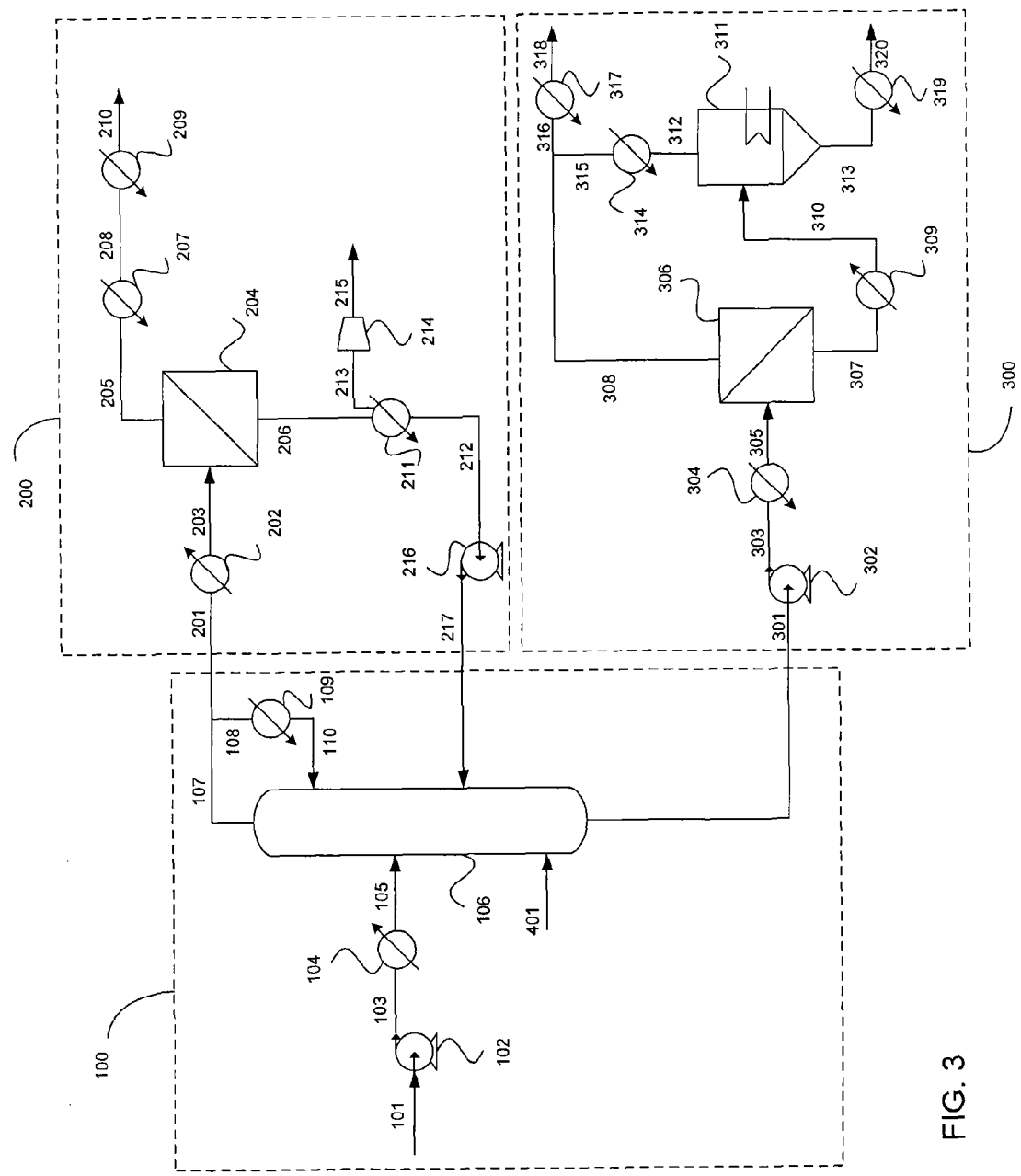
FIG. 3 is a process flow diagram of a second processing plant embodying the present invention.
Figure 4:
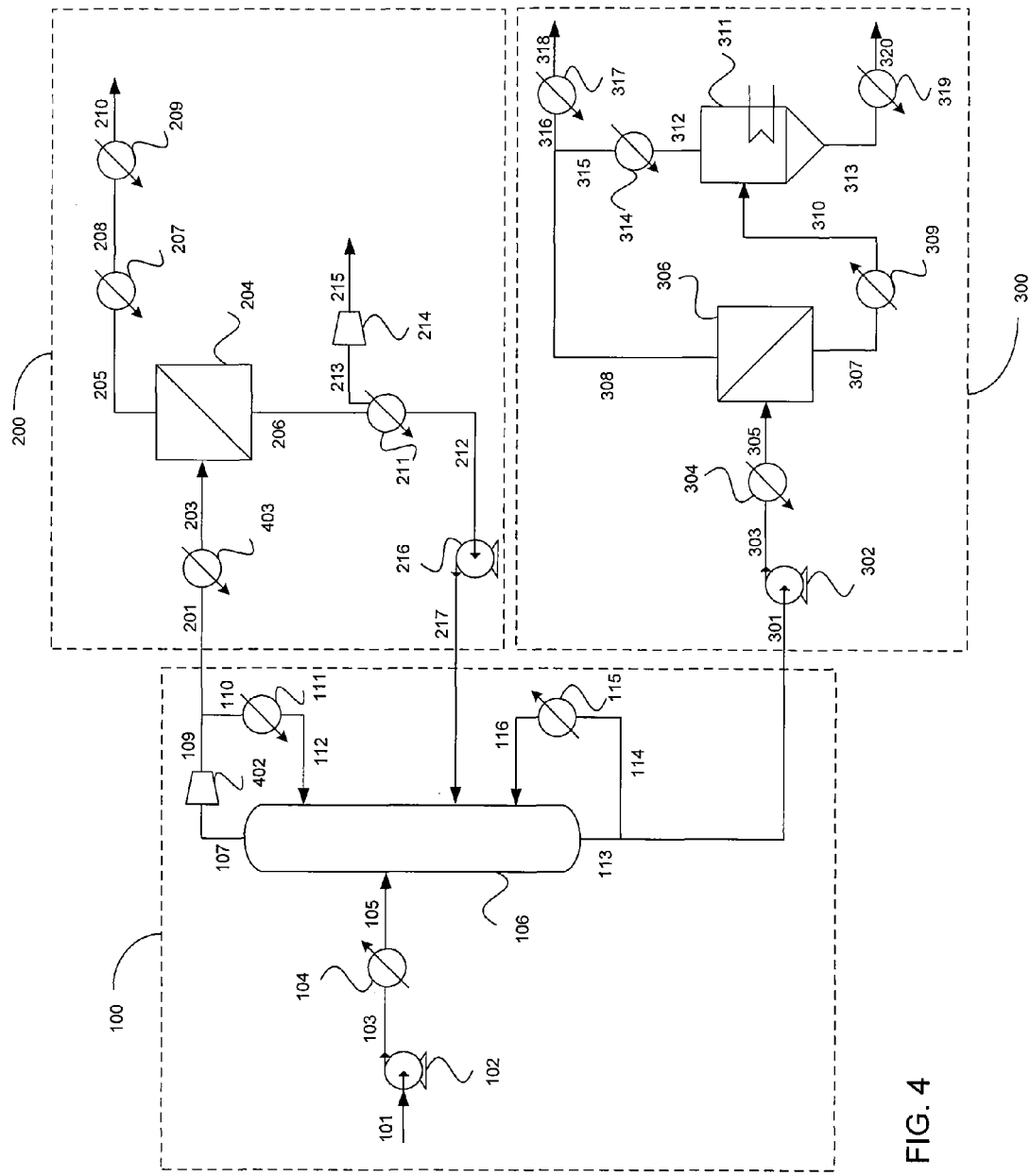
FIG. 4 is a process flow diagram of a third processing plant embodying the present invention.
Figure 5:
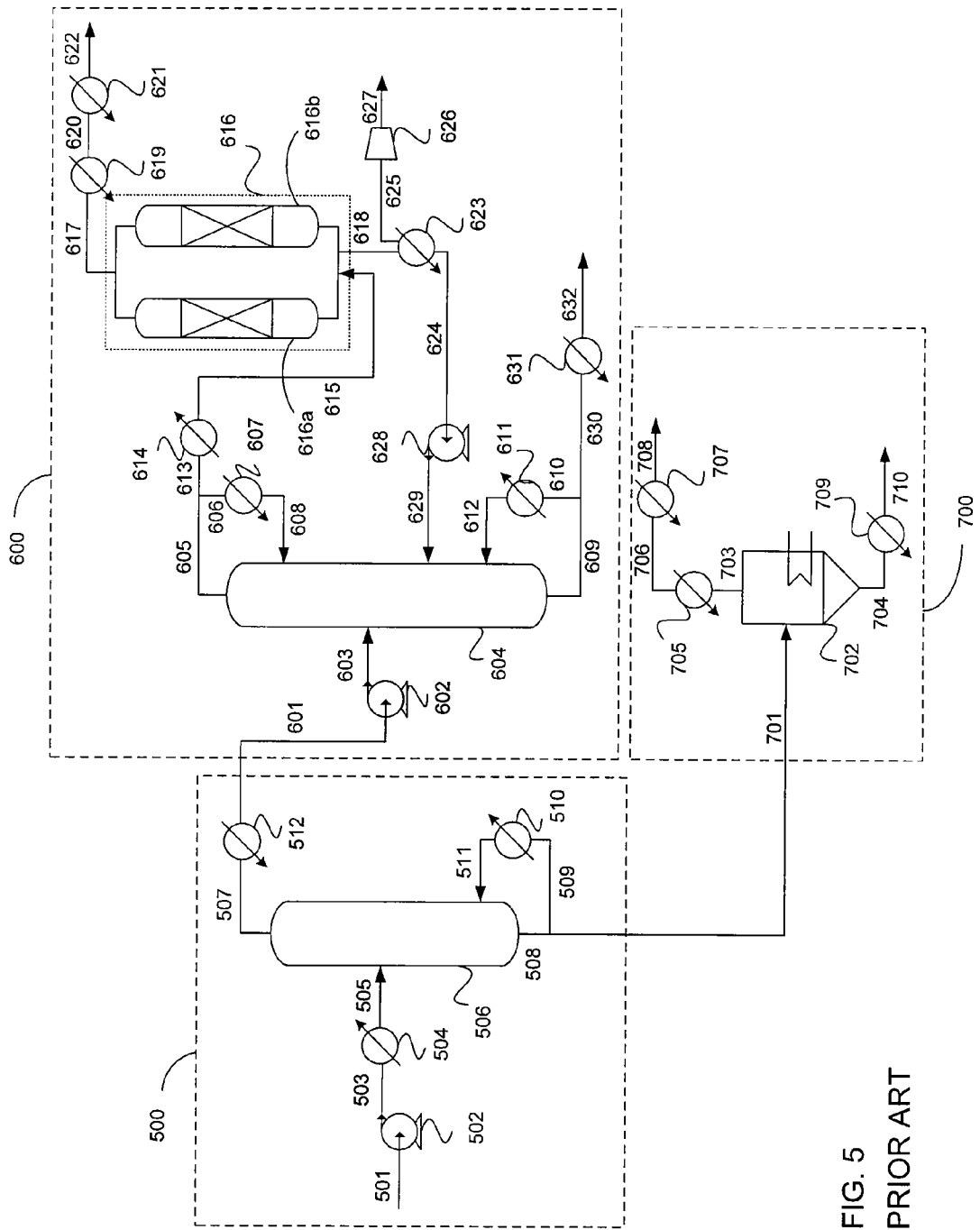
FIG. 5 is a process flow diagram of a processing plant representing the prior art.

While the features defining this invention are capable of implementation in a variety of plant designs and flow diagrams, the invention as a whole will be best understood by a detailed examination of specific embodiments. Process flow diagrams for such embodiments are shown in FIGS. 2, 3, and 4, and are compared with a process of the prior art whose flow diagram is shown in FIG. 5.

Figure 2:
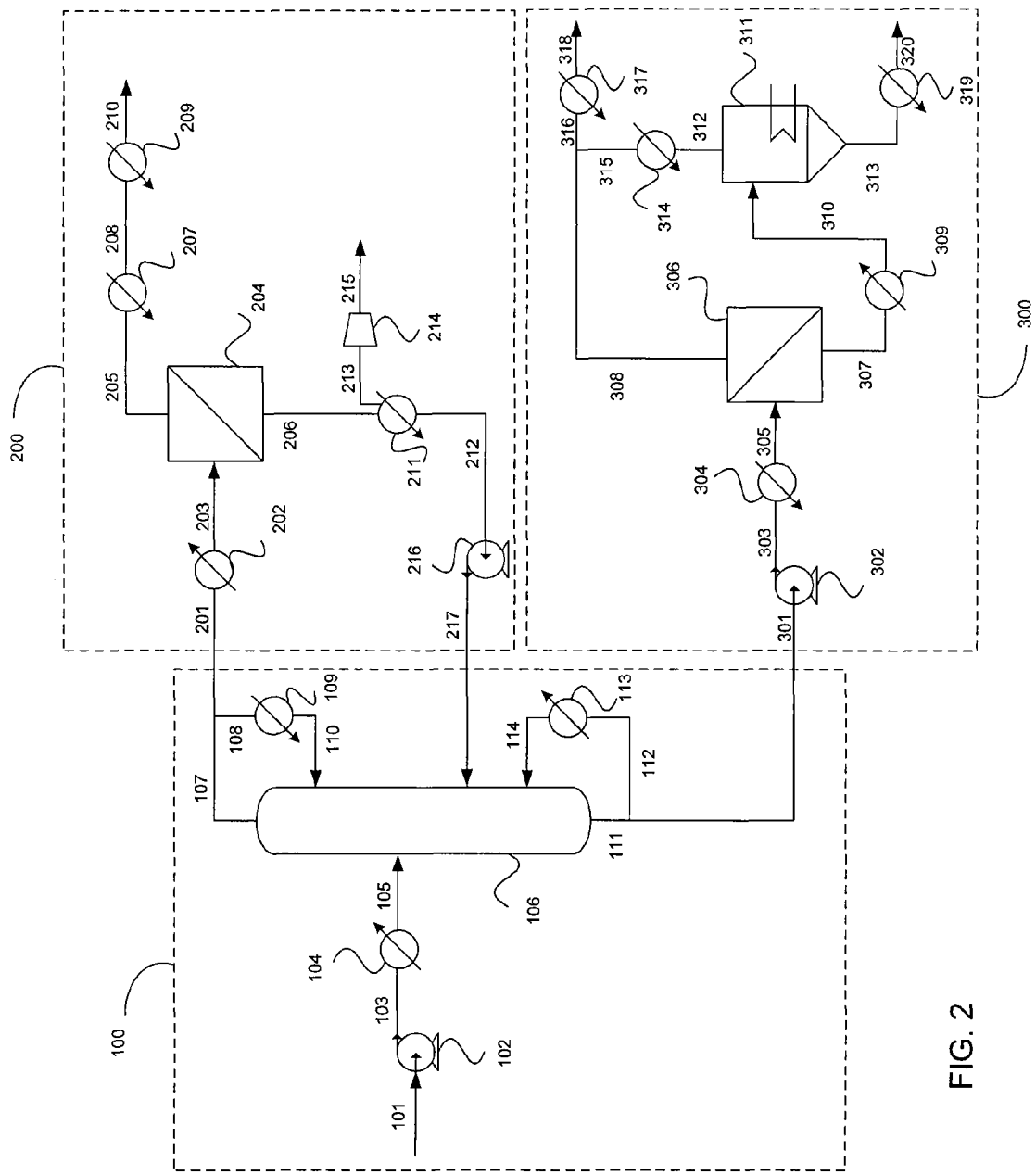
FIG. 2 is a process flow diagram of a processing plant embodying the present invention.

FIG. 2 is a schematic drawing of an embodiment of the invention showing the distillation section 100, the first membrane separation (organic dehydration) section 200, and the second membrane separation (solids concentration) section

300. The distillation section 100 contains a distillation column operated at super-atmospheric pressure with reflux, and energy for the distillation is supplied by the reboiler. The first membrane separation section 200 is operated in vapor permeation process mode, and the water-rich permeate from the first membrane separation section is recycled to the distillation section. The second membrane separation section 300 is operated in reverse osmosis process mode, and the solids-rich stream from the second membrane separation section is further treated by evaporation for additional solids concentration.

A fluid mixture 101 emerging from an upstream unit operation is used as the feed to the system, and is pressurized to an appropriate pressure in a feed pump 102. The pressurized stream 103 is preheated in a preheater 104 and then fed to the stripper/rectifier (distillation) column 106 in which the feed stream is divided into an LBO-rich overhead stream 107 and the solids-rich bottoms stream 111. The energy for the distillation is provided by a reboiler 113.

The stripper/rectifier column 106 is operated above atmospheric pressure and with reflux. A fraction 108 of the column overhead stream 107 is condensed in an overhead condenser 109 and the condensed liquid stream 110 is recycled to the stripper/rectifier column 106 as reflux for enrichment of the LBOs. The LBO-rich fraction of the column overhead stream that is not condensed is the incoming stream 201 to the first membrane separation section 200 where it is heated in a superheater 202 to prevent condensation. The superheated stream 203 that emerges from the superheater 202 is fed to an LBO dehydration membrane 204 to dry the LBO. The superheated stream 203 is separated by the dehydration membrane 204 into a substantially dry LBO-rich retentate stream 205 and a water-rich permeate stream 206. The dry LBO-rich stream 205 is condensed in a product condenser 207. The condensed dry LBO-rich stream 208 is cooled in a product cooler 209 and may be sent to an additional treatment step, or used elsewhere in the process, or sent to disposal or storage. The permeate side of the LBO dehydration membrane 204 is maintained under vacuum to create the driving force for permeation of water vapor. The water-rich permeate stream 206 is condensed in a permeate condenser 211. The condensed water-rich liquid stream 212 from the condenser 211 is pressurized by a pump 216 and recycled to the stripper/rectifier column 106 at the appropriate location for additional recovery of the LBO. The non-condensable stream 213 from the condenser 211 is directed to a vacuum system 214 and the exhaust stream 215 may be further treated, flared or vented.

In the distillation section 100, a fraction 112 of the solids-rich bottoms stream 111 is recycled to the distillation column after it is vaporized in stripper/rectifier reboiler 113. The remainder of the solids-rich bottom stream is the incoming stream 301 to the second membrane separation section 300 where it is pressurized in a stripper/rectifier bottoms pump 302 and then cooled in a bottoms cooler 304 to an acceptable temperature for the membrane to be used in the solids concentration (second membrane separation) unit 306. The cooled solids-rich stream 305 that emerges from the bottoms cooler 304 is fed to the solids concentration (second membrane) unit 306 that contains a membrane suitable for operation in reverse osmosis process mode. The RO membrane used in the second membrane separation unit 306 divides the incoming stream into a water-rich permeate stream 308 and a concentrated solids stream 307. The concentrated solids stream 307 is preheated in an evaporator feed preheater 309 and fed to a double-effect evaporator 311. The bottoms stream 313 from the double-effect evaporator 311 is cooled in an evaporator bottoms cooler 319 and the resulting stream 320 can be additionally treated, reused elsewhere in the process, disposed of, or sent to storage. In systems in which the evaporator bottoms stream 313 is further concentrated by applying heat, an evaporator bottoms cooler 319 is not necessary. The evaporated water stream 312 from the double-effect evaporator 311 is condensed in an evaporator overhead condenser 314 and then cooled in an overhead evaporator cooler 317 after it is mixed with the permeate stream 308. The combined and cooled water-rich stream 318 can be treated further, reused elsewhere in the process, discharged, or sent to storage. Alternatively, the water-rich permeate stream 308 from the membrane unit 306 and the condensed overhead 315 from the double-effect evaporator 311 can be treated separately rather than combined.

The heating duty for the reboiler 113 in the distillation section 100 and for the various heaters can be provided by steam or any suitable heat source from elsewhere in the process, or from another heating medium such as hot oil. The cooling duty in the condensers and coolers can be provided by cooling water, chilled water or liquid. The cooling duty is preferably provided by heat exchange with an appropriate stream for heat recovery.

FIG. 3 is a variation on the system of FIG. 2, in which the reboiler 113 of the distillation section 100 of FIG. 2 is eliminated. Heat to drive the stripper/rectifier column 106 is instead provided by an energy stream 401 which is preferably an open steam such as steam at a suitable pressure fed directly into the column 106. This avoids the necessity for cleaning of the stripper/rectifier reboiler 113 of the system of FIG. 2. This does however entail mixing of the energy stream with the process fluids.

FIG. 4 is another variation on the system of FIG. 2. In this variation, the distillation (stripper/rectifier) column 106 is operated at a pressure that is at or close to atmospheric pressure. The overhead stream 107 from the distillation column is compressed in a vapor compressor 402. Since the vapor compressor 402 will heat the column overhead stream 107, a discharge cooler 403 is used instead of the superheater 202 of the system of FIG. 2. This will allow the same extent of energy recovery as the embodiment described in FIG. 2. An advantage of the system of FIG. 4 is that the distillation column 106 will undergo less fouling than distillation columns operated above atmospheric pressure since the lower pressure will allow the use of a lower operating temperature. The sizes of the membrane separation units 204 and 306 and consequently the costs associated with these units will remain unaffected.

FIGS. 2, 3, and 4 and the calculations offered below in reference to these figures are intended to be illustrative and not to limit the scope of the invention in any manner.

EXAMPLES

Calculations were performed to illustrate the energy efficiency of the processes of the present invention as compared to conventional processes. A commercially available process simulator package, ChemCAD from ChemStations Inc., Houston, Tex., USA, was used. Mathematical models were developed to simulate the performance of the molecular dehydration and solid-liquid separation membranes. Theoretical, semi-empirical, and empirical correlations were used to calculate the membrane area for a specific application based on the feed characteristics, desired separation and operating conditions. The mathematical models for membrane-based separations were integrated into the ChemCAD package for simulations of the integrated processes.

The following assumptions were made in the calculations:
(1) For energy consumption calculations, only major steam and power loads were considered (for example: the power requirement for pressure pumps has not been included).
(2) Pressure drops in the all unit operations have not been considered.
(3) NRTL (Non-Random Two-Liquid) Thermodynamic Method was used for all simulations.
(4) The heat capacities of the solids were assumed to be negligible.

Example 1

Treatment of Product Stream from Molasses-Based Ethanol Plant—Invention vs. Prior Art This example illustrates the energy savings of the process of the present invention when applied to the production of ethanol from sugarcane molasses. The design basis for the plant is shown in Table I:

TABLE I

Design Basis for Ethanol Plant

| | |
|---|---|
| Annual Ethanol Production | 60 KLPD (5.6 MMGPY*) |
| Feed Flow (from fermentor) | 55,116 lb/h |
| Composition: | |
| Ethanol | 8 weight % |
| Water | 82 weight % |
| Total Solids (TS) | 10 weight % |
| Column Bottoms Ethanol Content | 0.01 weight % (100 ppmw) |
| Product Ethanol Water Content | 0.5 weight % |
| Concentrated Solids Water Content | 40 weight % |

*MMGPY: million gallons per year (353 days/year)

For the calculations in this example, any minor organics and carbon dioxide in the feed have not been taken into consideration. All percents are by weight unless otherwise indicated.

Prior Art

The multi-stage distillation process shown in FIG. 5 is a conventional (prior art) process for the separation of organic liquids, water, and solids emerging from the fermentor in a molasses-based ethanol plant. The process includes a distillation section 500, an organics dehydration section 600, and a solids concentration section 700. Unit and stream numbers not appearing in the following discussion are identified in the ensuing tables.

In the distillation section 500, the mixture 501 from the fermentor is fed to a beer stripper 506 operating under atmospheric conditions without reflux. The feed stream 501 is separated in the stripper into an ethanol-rich overhead stream 507 (containing approximately 50% ethanol and 50% water) and a solids-rich bottom stream 508 (containing approximately 12% solids and 88% water). The overhead stream 507 is condensed in a beer stripper overhead condenser 512 and then enters the organics dehydration section 600 where it is pressurized to 90 psig by a stripper/rectifier feed pump 602 and fed to a stripper/rectifier column 604 at the appropriate location. The stripper/rectifier column 604 is operated with reflux to achieve an azeotropic concentration of approximately 93% ethanol in its overhead stream 605, and a composition of less than 100 ppmw ethanol in the bottoms stream 609. Steam is typically provided to a reboiler 611 of the stripper/rectifier column 604, and the stripper/rectifier column 604 is operated with the energy of a reflux stream 612.

The overhead stream 613 from the stripper/rectifier column 602 at azeotropic concentration is superheated to avoid condensation of the feed in molecular sieve beds, and then sent to the molecular sieve-based PSA system 616 for final water removal. The PSA system 616 typically uses two beds 616a, 616b of molecular sieve adsorbent in cyclic batch mode. In the adsorption cycle, the azeotropic mixture from the stripper/rectifier column flows through the first bed 616a and an anhydrous alcohol stream 617 containing less than 0.5% water is produced. The product ethanol is condensed in the product condenser 619 and cooled in a product cooler 621 before it is sent to storage. The energy of the product stream is recovered elsewhere in the process. A fraction of the product flows as purge through the second bed 616b of the PSA system, which is in a regeneration mode. The resulting regeneration stream 618 contains about 60% ethanol. This regenerated alcohol stream is condensed in the PSA regeneration condenser 623 using cooling water. The condensed liquid stream 624 is recycled for ethanol recovery to the appropriate location in the stripper/rectifier column 604. The non-condensable stream 625 from the regeneration condenser 623 is directed to a vacuum system 626 and the exhaust stream 627 is further treated, flared or vented.

The solids-rich bottoms stream from beer stripper column 506 enters the solids concentration section 700 as a stream 701 containing approximately 12% TS, where it is fed to a multi-effect evaporator (typically, four effects) 702 to concentrate the solids up to approximately 60% for use as condensed molasses solubles (CMS). The CMS is used as a cattle feed additive or as boiler fuel for burning in an incinerator, or is converted to nutrient-rich compost to reduce land area requirements for composting. The energy for evaporation is provided by steam and/or partially by an energy stream elsewhere in the process. The bottoms stream 630 from the stripper/rectifier column 604 in the organic dehydration section 600 and the condensate stream 708 from the solids concentration (evaporator) system 700 are generally recycled for reuse in the process. Additional treatment may be necessary for water purification depending on the intended use. The conventional process as illustrated in FIG. 5 is heat-integrated and energy is recovered between the distillation-dehydration and evaporation sections to the extent possible.

The design basis and specifications for the beer stripper column 506, the stripper/rectifier column 604, the PSA system 616, and the multi-effect evaporator 702 are listed in Table II. The mass balance details for all the major streams and operating conditions are listed in Table III, and the energy details are listed in Table IV.

TABLE II

Design Basis and Specifications for Prior Art System

| Design Basis | | Design Specifications | |
|---|---|---|---|
| Beer Stripper Column (506) | | | |
| Overhead Ethanol Concentration | 50 weight % | Number of Trays (Theoretical) | 15 |
| Bottoms Ethanol Concentration | 100 ppmw | Reflux Ratio | Nil |
| | | Operating Pressure | atm |

TABLE II-continued

Design Basis and Specifications for Prior Art System

Stripper/Rectifier Column (604)

| | | | |
|---|---|---|---|
| Overhead Ethanol Concentration | 93 weight % | Number of Trays (Theoretical) | 33 |
| Bottoms Ethanol Concentration | 100 ppmw | Reflux Ratio | 3.3 |
| | | Operating Pressure | 90 psig |

PSA System (616)

| Design Basis | | Design Specifications* | |
|---|---|---|---|
| Product Ethanol Concentration | 99.5 weight % | Adsorbent Mass | 9.0 tons |
| Regen Ethanol Concentration | 60 weight % | Operating Pressure | 90 psig |
| | | Regeneration Pressure | 1.9 psia |

Multi-Effect Evaporator (702)

| Design Basis | | Design Specifications | |
|---|---|---|---|
| Final Solids Concentration | 60 weight % | Number of Effects | 4 |
| | | Operating Pressure | atm |

*Technical Bulletin: "Molecular Sieves for Alcohol Drying," Robert E. Trent, Technical Manager, Zeochem LLC

TABLE III

Mass Balance and Operating Conditions for Prior Art System

| Stream No. (FIG. 5) | Stream Name | Flow Rate [lb/h] | Temp. [F.] | Pressure [psig] | Composition [weight %] Ethanol | Water | TS |
|---|---|---|---|---|---|---|---|
| 501 | Feed Fluid Mixture | 55116 | 95 | 0 | 8.0 | 82.0 | 10.0 |
| 601 | Beer Stripper Overhead | 8839 | 179 | 0 | 49.8 | 50.2 | 0.0 |
| 701 | Beer Stripper Bottoms | 46276 | 212 | 0 | 0.0 | 88.1 | 11.9 |
| 613 | Stripper/Rectifier Overhead | 5217 | 281 | 90.0 | 93.5 | 6.5 | 0.0 |
| 632 | Stripper/Rectifier Bottoms | 4413 | 95 | 90.0 | 0.0 | 100.0 | 0.0 |
| 622 | Product | 4426 | 95 | 90.0 | 99.5 | 0.5 | 0.0 |
| 629 | PSA Regen | 791 | 95 | 100.0 | 60.0 | 40.0 | 0.0 |
| 708 | Evaporator Overhead | 37097 | 95 | 14.0 | 0.0 | 100.0 | 0.0 |
| 710 | Evaporator Bottoms | 9179 | 95 | 14.0 | 0.0 | 40.0 | 60.0 |

TABLE IV

Energy Consumption for Prior Art System

| | | | [MMBTU/h] | | |
|---|---|---|---|---|---|
| No. (FIG. 5) | Component Name | Pressure [psig] | Temp. [F.] | Heating Duty | Cooling Duty | Heat Recoverable Inside Battery Limit |
| 504 | Feed Preheater | 15 | 95-180 | 4.1 | | |
| 510 | Beer Stripper Reboiler | 0 | 212 | 7.4 | | |
| 512 | Beer Stripper Condenser | 0 | 182 | | −6.0 | 68% |
| 607 | Stripper/Rectifier Condenser | 90 | 281 | | −6.0 | ~100% |
| 611 | Stripper/Rectifier Reboiler | 90 | 331 | 9.0 | | |
| 614 | PSA Feed Superheater | 90 | 280-316 | 0.1 | | |
| 619 | Product Condenser | 90 | 316-281 | | −1.5 | ~100% |
| 621 | Product Cooler | 90 | 281-95 | | −0.6 | Nil |
| 623 | PSA Regen Condenser | 1.9 psia | 281-95 | | −0.6 | Nil |

TABLE IV-continued

Energy Consumption for Prior Art System

[MMBTU/h]

| No. (FIG. 5) | Component Name | Pressure [psig] | Temp. [F.] | Heating Duty | Cooling Duty | Heat Recoverable Inside Battery Limit |
|---|---|---|---|---|---|---|
| 631 | Stripper/Rectifier Bottoms Cooler | 90 | 331-95 | | −1.1 | Nil |
| 702 | Multi-Effect Evaporator | 14 | 235-248 | 9.5 | | |
| 705 | Evaporator Overhead Condenser | 0 | 212 | | −8.7 | Nil |
| 707 | Evaporator Overhead Cooler | 0 | 230-95 | | −5.0 | Nil |
| 709 | Evaporator Bottoms Cooler | 14 | 248-95 | | −0.6 | Nil |
| | Total | | | 30.1 | −30.1 | −11.6 |
| | Net Heating Duty | | | 18.5 | | |
| | BTU/gallon of ethanol | | | 27,800 | | |
| | lb of steam/gallon of ethanol (1130 lb steam = 1 MMBTU) | | | 31.4 | | |

This Invention

The desired separations, recovery and drying of ethanol and concentration of solids for a molasses-based fuel-grade ethanol plant are much more efficiently accomplished by the embodiment of the process of the present invention as illustrated in FIG. 2 than the conventional process both in terms of capital expenditure and operating costs. The following is a description of the operating conditions for comparison to those for FIG. 5 above.

Referring to FIG. 2, the fluid mixture feed stream 101 from the fermentor is pressurized to 65 psig by the feed pump 102, and the pressurized stream 103 is preheated in the feed preheater 104 and then fed to the stripper/rectifier column (distillation section) 106 wherein the feed stream is divided into the organic-rich overhead stream 107 and the solids-rich bottoms stream 111. The energy for distillation is provided by providing energy in the stripper/rectifier reboiler 113.

The stripper/rectifier column 106 is operated at 65 psig with reflux to achieve 88% low-boiling organics in the overhead stream 107. A fraction 108 of the overhead stream is condensed in the stripper/rectifier overhead condenser 109, and the condensed liquid stream 110 is recycled to the stripper/rectifier column 106 as reflux for enrichment of the organics. The fraction of the column overhead stream 107 that is not condensed enters the organic dehydration (first membrane separation) section 200 as an incoming stream 201 which is heated in the superheater 202 to prevent condensation. The superheated stream 203 that emerges from the superheater 202 is fed to the membrane unit 204, which is a Zeolite A Membrane-Based Vapor Permeation Membrane Module Array, to dry the ethanol. In the membrane unit 204, the superheated stream 203 is separated into an anhydrous ethanol stream 205 containing less than 0.5% water and a water-rich permeate stream 206 containing up to 2.0% ethanol. The anhydrous ethanol stream 205 is condensed in the product condenser 207 to produce a condensed anhydrous ethanol stream 208 that is then cooled in the product cooler 209 before it is sent to storage. The energy of the product stream is recovered elsewhere in the process. The permeate side of the membrane is maintained under vacuum (0.2-1.2 psia) to create the driving force for permeation of water vapor. The water-rich permeate stream 206 is condensed in the first membrane unit permeate condenser 211. The condensed water-rich liquid stream from the condenser 211 is pressurized in the permeate pump 216 and fed back to the stripper/rectifier column 106 in the distillation section 100 at the appropriate location for additional recovery of ethanol. The non-condensable stream 213 from the condenser 211 is directed to a vacuum system 214, and the exhaust stream 215 may be further treated, flared or vented.

A fraction of the solids-rich bottoms stream 111 from the stripper/rectifier column 106 is recycled to the distillation column after it is vaporized in stripper/rectifier reboiler 113. The remainder of the solids-rich bottom stream is fed as the incoming stream 301 to the solids concentration (second membrane separation) section 300 where it is pressurized by the stripper/rectifier bottoms pump 302 to 600 psig and then cooled in the stripper/rectifier bottoms cooler 304 to 113° F. (45° C.), which is an acceptable temperature for an LFC1 (crosslinked polyamide) reverse osmosis membrane. The cooled solids-rich stream 305 that emerges from the cooler 304 is fed to the membrane separation unit 306 which contains a Disk Tube Membrane Module Array with LFC1 membrane. The membrane splits the column bottoms stream into a water-rich permeate stream 308 and a concentrated solids stream 307. The concentration solids stream 307 is then preheated in the evaporator feed preheater 309 and fed into the double-effect evaporator 311. The bottoms stream 313 from the evaporator 311 is concentrated to 60% TS to produce condensed molasses solubles (CMS), which can be used as a cattle feed additive or as boiler fuel, or be burnt in an incinerator, or can be used to manufacture nutrient-rich compost. The evaporated water stream 312 from the evaporator 311 is condensed in the evaporator overhead condenser 314 and then mixed with permeate stream 308 and cooled in the water cooler 317. The combined water-rich stream is generally recycled for reuse in the process. Additional treatment may be necessary for water purification depending on the intended use.

As noted above, the heating duty in the reboilers and heaters can be provided by steam or by a suitable heat source from elsewhere in the process, or by another heating medium such as hot oil. The cooling duty in the condensers and coolers can be provided by cooling water, chilled water or liquid. The cooling duty is preferably provided by heat exchange with an appropriate stream for heat recovery. The process illustrated in FIG. 2 is heat integrated and energy is recovered between the distillation-organic dehydration (first membrane separation) and solid-concentration (second membrane separation) sections to the extent possible.

The specifications for the membrane unit in the organics dehydration section are listed in Table V, and the specifications for the membrane unit in the solids concentration section are listed in Table VI. The design basis and specifications for the stripper/rectifier column 106, the membrane unit 204 in the organics dehydration section, the membrane unit 306 in the solids concentration section, and the multi-effect evaporator 311 are listed in Table VII. The mass balance details and operating conditions for all the major streams are listed in Table VIII, and the energy details for all the major streams are listed in Table IX.

TABLE V

Specifications for Invention First Membrane Section
(Mitsui Engineering & Shipbuilding Brochure entitled
"Zeolite Membrane & Module")

| | |
|---|---|
| Membrane Manufacturer | Mitsui Engineering & Shipbuilding, Japan |
| Module Manufacturer | Mitsui Engineering & Shipbuilding, Japan |
| Flow | Mixed (Combination of Co-Current and Counter-Current) |
| Material | Inorganic |
| Selective Layer | NaA Zeolite Film |
| Substrate | Ceramic Tube |
| Morphology | Composite: NaA Zeolilte Film coated on Ceramic Tube (external) |
| Membrane Physical Structure and Dimensions | Tube: 12 mm OD × 1.5 t × 800 L |
| Membrane Module | Tubular |

TABLE V-continued

Specifications for Invention First Membrane Section
(Mitsui Engineering & Shipbuilding Brochure entitled
"Zeolite Membrane & Module")

| | |
|---|---|
| Maximum Operating Pressure | 150 psig |
| Maximum Operating Temperature | 300° F. |
| Estimated Water Permeation Flux, [mol/m$^2 \cdot$ s $\cdot$ Pa]/[GPU] | $1.1 \times 10^{-06}$/3300 |
| Estimated Selectivity (water/ethanol) | 2000 |

TABLE VI

Specifications for Invention Second Membrane Section
(Hydranautics Brochure entitled "Membrane Element LFC1" and Rochem Separation Systems website http://www.rochemindia.com/distillery.html)

| | |
|---|---|
| Membrane Manufacturer | Hydronautics, CA |
| Module Manufacturer | Rochem Separation Systems, India |
| Flow | Open Channel Cross-Flow |
| Material | Polymeric |
| Selective Layer | Composite Polyamide, Neutrally Charged |
| Substrate | Polysulfone |
| Morphology | Composite |
| Membrane Physical Structure and Dimensions | Flat Sheet |
| Membrane Module | Disk and Tube |
| Maximum Operating Pressure | 600 psig |
| Maximum Operating Temperature | 113° F. |
| Estimated Membrane Constant, A | 0.13 GFD/psi |
| Rejection Coefficient | 100% (assumed) |

TABLE VII

Design Basis and Specifications for Invention System

| Design Basis | | Design Specifications | |
|---|---|---|---|
| Stripper/Rectifier Column (106) | | | |
| Overhead Ethanol Concentration | 88 weight % | Number of Trays (Theoretical) | 32 |
| Bottoms Ethanol Concentration | 100 ppmw | Reflux Ratio | 2.9 |
| | | Operating Pressure | 65 psig |
| Organic Dehydration Membrane (204) | | | |
| Water Permeation Flux, [mol/m$^2 \cdot$ s $\cdot$ Pa] | $1.1 \times 10^{-06}$ | Total Membrane Area | 91 m$^2$ |
| Selectivity (Water/Ethanol) | 2000 | Feed Pressure | 65 psig |
| Product Ethanol Concentration | 99.5 weight % | Permeate Pressure | 0.2-1.2 psia |
| Solid Concentration Membrane (306) | | | |
| Average Water Flux | 19.5 GFD | Total Membrane Area | 4800 ft$^2$ |
| Solids Rejection Coefficient (assumed) | 100% | Feed Pressure | 600 psig |
| Solids Concentration in Retentate | 30 weight % | Feed Temperature | 113° F. |
| Multi-effect Evaporator (311) | | | |
| Final Solids Concentration | 60 weight % | Number of Effects | 2 |
| | | Operating Pressure | atm |

TABLE VIII

Mass Balance and Operating Conditions for Invention System

| Stream No. (FIG. 2) | Stream Name | Flow Rate [lb/h] | Temp. [F.] | Pressure [Psig] | Composition [weight %] Ethanol | Water | TS |
|---|---|---|---|---|---|---|---|
| 101 | Feed Fluid Mixture | 55116 | 95 | 0 | 8.0 | 82.0 | 10.0 |
| 201 | Stripper/Rectifier Overhead | 4970 | 264 | 65 | 88.8 | 11.2 | 0.0 |
| 301 | Stripper/Rectifier Bottoms | 50690 | 312 | 65 | 0.0 | 89.1 | 10.9 |
| 210 | Product | 4426 | 95 | 65 | 99.5 | 0.5 | 0.0 |
| 217 | First Membrane Permeate | 544 | 93 | 70 | 1.6 | 98.4 | 0.0 |
| 307 | Second Membrane Retentate | 18387 | 113 | 65 | 0.0 | 70.0 | 30.0 |
| 308 | Second Membrane Permeate | 32302 | 113 | 0 | 0.0 | 100.0 | 0.0 |
| 315 | Evaporator Overhead | 9192 | 95 | 14.0 | 0.0 | 100.0 | 0.0 |
| 320 | Evaporator Bottoms | 9195 | 95 | 14.0 | 0.0 | 40.0 | 60.0 |

TABLE IX

Energy Details for Invention System

| No. (FIG. 2) | Component Name | Pressure [psig] | Temp. [F.] | Heating Duty [MMBTU/h] | Cooling Duty [MMBTU/h] | Heat Recoverable [MMBTU/h] Inside Battery Limit | Outside Battery Limit |
|---|---|---|---|---|---|---|---|
| 104 | Feed Preheater | 65 | 95-281 | 9.1 | | | |
| 109 | Stripper/Rectifier Condenser | 65 | 264 | | -5.7 | 84% | 16% |
| 113 | Stripper/Rectifier Reboiler | 65 | 312 | 9.1 | | | |
| 202 | Superheater | 65 | 264-273 | 0.02 | | | |
| 207 | Product Condenser | 65 | 273-263 | | -1.4 | | ~100% |
| 209 | Product Cooler | 65 | 263-95 | | -0.5 | Nil | |
| 211 | First Membrane Permeate Condenser | 0.2-1.2 psia | 243-93 | | -0.6 | Nil | |
| 304 | Stripper/Rectifier Bottoms Cooler | 65 | 312-113 | | -9.1 | ~100% | |
| 309 | Evaporator Feed Preheater | 0 | 113-194 | 1.0 | | | |
| 311 | Multi-Effect Evaporator | 14 | 212 | 4.8 | | | |
| 314 | Evaporator Overhead Condenser | 0 | 212 | | -4.3 | 23% | |
| 317 | Water Cooler | 14 | 139-95 | | -1.8 | Nil | |
| 319 | Evaporator Bottoms Cooler | 14 | 248-95 | | -0.6 | Nil | |
| | Total: | | | 24.0 | -24.0 | -14.9 | -2.3 |
| | Net Heating Duty | | | 6.8 | | | |
| | BTU/gallon of ethanol | | | 10200 | | | |
| | lb steam/gallon of ethanol (1130 lb steam = 1 MMBTU) | | | 11.5 | | | |

Example 2

Further Use of Invention in Treatment of Product Stream from Molasses-Based Ethanol Plant

This example illustrates the use of a plant design according to FIG. 3 for treatment of the same product stream treated in Example 1. The design basis and specifications for the stripper/rectifier column 106, the membrane unit 204 in the organics dehydration section, the membrane unit 306 in the solids concentration section, and the multi-effect evaporator 311 in the solids concentration section are listed in Table X. The mass balance details and operating conditions for all the major streams are listed in Table XI, and the energy details for all the major streams are listed in Table XII.

TABLE X

Design Basis and Specifications for Invention System

| Design Basis | | Design Specifications | |
|---|---|---|---|
| Stripper/Rectifier Column (106) | | | |
| Overhead Ethanol Concentration | 88 weight % | Number of Trays (Theoretical) | 32 |
| Bottoms Ethanol Concentration | 100 ppmw | Reflux Ratio | 3.1 |
| | | Operating Pressure | 65 psig |
| Organic Dehydration Membrane (204) | | | |
| Water Permeation Flux, $[mol/m^2 \cdot s \cdot Pa]$ | $1.1 \times 10^{-06}$ | Total Membrane Area | 94 $m^2$ |
| Selectivity (Water/Ethanol) | 2000 | Feed Pressure | 65 psig |
| Product Ethanol Concentration | 99.5 weight % | Permeate Pressure | 0.2-1.2 psia |
| Solid Concentration Membrane (306) | | | |
| Average Water Flux | 22 GFD | Total Membrane Area | 5500 $ft^2$ |
| Solids Rejection Coefficient (assumed) | 100% | Feed Pressure | 600 psig |
| Solids Concentration in Retentate | 30 weight % | Feed Temperature | 113° F. |
| Multi-effect Evaporator (311) | | | |
| Final Solids Concentration | 60 weight % | Number of Effects | 2 |
| | | Operating Pressure | atm |

TABLE XI

Mass Balance and Operating Conditions for Invention System

| Stream No. | | Flow Rate | Temp. | Pressure | Composition [weight %] | | |
|---|---|---|---|---|---|---|---|
| (FIG. 3) | Stream Name | [lb/h] | [F.] | [Psig] | Ethanol | Water | TS |
| 101 | Feed Fluid Mixture | 55116 | 95 | 0 | 8.0 | 82.0 | 10.0 |
| 201 | Stripper/Rectifier Overhead | 5054 | 264 | 65 | 87.4 | 12.6 | 0.0 |
| 301 | Stripper/Rectifier Bottoms | 60661 | 312 | 65 | 0.0 | 91.0 | 9.0 |
| 210 | Product | 4430 | 95 | 65 | 99.5 | 0.5 | 0.0 |
| 217 | First Membrane Permeate | 624 | 93 | 70 | 1.5 | 98.5 | 0.0 |
| 307 | Second Membrane Retentate | 18387 | 113 | 65 | 0.0 | 70.0 | 30.0 |
| 308 | Second Membrane Permeate | 42274 | 113 | 0 | 0.0 | 100.0 | 0.0 |
| 315 | Evaporator Overhead | 9202 | 230 | 14.0 | 0.0 | 100.0 | 0.0 |
| 320 | Evaporator Bottoms | 9185 | 95 | 14.0 | 0.0 | 40.0 | 60.0 |

TABLE XII

Energy Consumption for Invention System

| No. (FIG. 3) | Component Name | Pressure [psig] | Temp. [F.] | Heating Duty [MMBTU/h] | Cooling Duty [MMBTU/h] | Heat Recoverable [MMBTU/h] Inside Battery Limit | Heat Recoverable [MMBTU/h] Outside Battery Limit |
|---|---|---|---|---|---|---|---|
| 104 | Feed Preheater | 65 | 95-295 | 9.8 | | | |
| 109 | Stripper/Rectifier Condenser | 65 | 264 | | −6.3 | 76% | 24% |
| — | Open Steam Energy | 80 | 324-95 | 11.3 | | | |
| 202 | Superheater | 65 | 264-273 | 0.02 | | | |
| 207 | Product Condenser | 65 | 273-263 | | −1.4 | | ~100% |
| 209 | Product Cooler | 65 | 263-95 | | −0.5 | Nil | |
| 211 | First Membrane Permeate Condenser | 0.2-1.2 psia | 243-93 | | −0.7 | Nil | |
| 304 | Stripper/Rectifier Bottoms Cooler | 65 | 312-113 | | −11.1 | 88% | |

TABLE XII-continued

Energy Consumption for Invention System

| No. (FIG. 3) | Component Name | Pressure [psig] | Temp. [F.] | Heating/Cooling Duty [MMBTU/h] | | Heat Recoverable [MMBTU/h] | |
|---|---|---|---|---|---|---|---|
| | | | | Heating Duty | Cooling Duty | Inside Battery Limit | Outside Battery Limit |
| 309 | Evaporator Feed Preheater | 0 | 113-194 | 1.0 | | | |
| 311 | Multi-Effect Evaporator | 14 | 212 | 4.8 | | | |
| 314 | Evaporator Overhead Condenser | 0 | 212 | | -4.3 | 24% | |
| 317 | Water Cooler | 14 | 134-95 | | -2.0 | Nil | |
| 319 | Evaporator Bottoms Cooler | 14 | 248-95 | | -0.6 | Nil | |
| | Total: | | | 26.9 | -26.9 | -15.6 | -2.9 |
| | Net Heating Duty | | | 8.4 | | | |
| | BTU/gallon of ethanol | | | 12600 | | | |
| | lb steam/gallon of ethanol (1130 lb steam = 1 MMBTU) | | | 14.2 | | | |

Example 3

Further Use of Invention in Treatment of Product Stream from Molasses-Based Ethanol Plant This example illustrates the use of a plant design according to FIG. 4 for treatment of the same product stream treated in Example 1. The design basis and specifications for the stripper/rectifier column 106, the membrane unit 204 in the organics dehydration section, the membrane unit 306 in the solids concentration section, and the multi-effect evaporator 311 in the solids concentration section are listed in Table XIII. The mass balance details and operating conditions for all the major streams are listed in Table XIV, and the energy details for all the major streams are listed in Table XV.

TABLE XIII

Design Basis and Specifications for Invention System

| Design Basis | | Design Specifications | |
|---|---|---|---|
| Stripper/Rectifier Column (106) | | | |
| Overhead Ethanol Concentration | 90 weight % | Number of Trays (Theoretical) | 24 |
| Bottoms Ethanol Concentration | 100 ppmw | Reflux Ratio | 2.6 |
| | | Operating Pressure | atm |
| Organic Dehydration Membrane (204) | | | |
| Water Permeation Flux, [mol/m$^2 \cdot$s$\cdot$Pa] | $1.1 \times 10^{-06}$ | Total Membrane Area | 85 m$^2$ |
| Selectivity (Water/Ethanol) | 2000 | Feed Pressure | 65 psig |
| Product Ethanol Concentration | 99.5 weight % | Permeate Pressure | 0.2-1.2 psia |
| Solid Concentration Membrane (306) | | | |
| Average Water Flux | 19.5 GFD | Total Membrane Area | 4800 ft$^2$ |
| Solid Rejection Coefficient (assumed) | 100% | Feed Pressure | 600 psig |
| Solid Concentration in Retentate | 30 weight % | Feed Temperature | 113° F. |
| Multi-effect Evaporator (311) | | | |
| Final Solid Concentration | 60 weight % | Number of Effects | 2 |
| | | Operating Pressure | atm |

TABLE XIV

Mass Balance and Operating Conditions for Invention System

| Stream No. (FIG. 4) | Stream Name | Flow Rate [lb/h] | Temp. [F.] | Pressure [Psig] | Composition [weight %] | | |
|---|---|---|---|---|---|---|---|
| | | | | | Ethanol | Water | TS |
| 101 | Feed Fluid Mixture | 55116 | 95 | 0 | 8.0 | 82.0 | 10.0 |
| 201 | Stripper/Rectifier Overhead | 4878 | 366 | 65 | 90.4 | 9.6 | 0.0 |

TABLE XIV-continued

Mass Balance and Operating Conditions for Invention System

| Stream No. | | Flow Rate | Temp. | Pressure | Composition [weight %] | | |
|---|---|---|---|---|---|---|---|
| (FIG. 4) | Stream Name | [lb/h] | [F.] | [Psig] | Ethanol | Water | TS |
| 301 | Stripper/Rectifier Bottoms | 50689 | 212 | 0 | 0.0 | 89.1 | 10.9 |
| 210 | Product | 4426 | 95 | 65 | 99.5 | 0.5 | 0.0 |
| 217 | First Membrane Permeate | 453 | 93 | 70 | 1.9 | 98.1 | 0.0 |
| 307 | Second Membrane Retentate | 18387 | 113 | 65 | 0.0 | 70.0 | 30.0 |
| 308 | Second Membrane Permeate | 32302 | 113 | 0 | 0.0 | 100.0 | 0.0 |
| 315 | Evaporator Overhead | 9192 | 95 | 14.0 | 0.0 | 100.0 | 0.0 |
| 320 | Evaporator Bottoms | 9195 | 95 | 14.0 | 0.0 | 40.0 | 60.0 |

TABLE XV

Energy Consumption for Invention System

| No. | | Pressure | Temp. | Heating/Cooling Duty [MMBTU/h] | | Heat Recoverable Inside Battery Limit |
|---|---|---|---|---|---|---|
| (FIG. 4) | Component Name | [psig] | [F.] | Heating | Cooling | [MMBTU/h] |
| 104 | Feed Preheater | 0 | 95-188 | 4.5 | | |
| 402 | Vapor Compressor | 0-65 | 173-366 | 1.4 | | |
| 111 | Stripper/Rectifier Condenser | 65 | 366-173 | | −6.2 | 91% |
| 115 | Stripper/Rectifier Reboiler | 0 | 212 | 8.4 | | |
| 403 | Compressor Discharge Cooler | 65 | 366-272 | | −0.2 | Nil |
| 207 | Product Condenser | 65 | 273-263 | | −1.4 | ~100% |
| 209 | Product Cooler | 65 | 263-95 | | −0.6 | Nil |
| 211 | First Membrane Permeate Condenser | 0.2-1.2 psia | 243-93 | | −0.5 | Nil |
| 304 | Stripper/Rectifier Bottoms Cooler | 65 | 212-113 | | −4.5 | ~100% |
| 309 | Evaporator Feed Preheater | 0 | 113-194 | 1.0 | | |
| 311 | Multi-Effect Evaporator | 14 | 212-248 | 4.8 | | |
| 314 | Evaporator Overhead Condenser | 0 | 212 | | −4.3 | 24% |
| 317 | Water Cooler | 14 | 139-95 | | −1.8 | Nil |
| 319 | Evaporator Bottoms Cooler | 14 | 248-95 | | −0.6 | Nil |
| | Total: | | | 20.1 | −20.1 | −12.6 |
| | Net Heating Duty | | | 7.5 | | |
| | BTU/gallon of ethanol | | | 11,300 | | |
| | lb steam/gallon of ethanol (1130 lb steam = 1 MMBTU) | | | 12.8 | | |

Summary

The combination of the two membrane separation sections with the column distillation section together with the ability of the first membrane separation section to dehydrate a low-boiling organic stream with significantly higher water concentrations than the azeotropic concentration combined with the ability of the second membrane separation section to concentrate the solids and reduce the load on the evaporator system unexpectedly result in an highly integrated and efficient system. Implementation of such a system will result in significant savings in both capital expenditures and operating costs. The savings in capital expenditures arise from the lack of a need for a multi-distillation unit and cyclic PSA process that requires complex controls and frequent maintenance. The use of a continuous solids concentration membrane process reduces the total number of evaporator effects.

The anticipated savings are shown in Table XVI, which lists the energy consumption for each of the plant designs represented by FIGS. 2, 3 and 4 operated under the conditions set forth in Examples 1, 2 and 3, and compares these to the corresponding values for the system of FIG. 5 (the prior art). In addition to savings in heating costs, savings will also be achieved in overall power, labor and maintenance costs.

TABLE XVI

Energy Comparison

|  | Prior Art | Processes of the Invention | | |
| --- | --- | --- | --- | --- |
|  | FIG. 5 | FIG. 2 | FIG. 3 | FIG. 4 |
| Total Heating Duty [MMBTU/h] | 30.1 | 24 | 26.9 | 20.1 |
| Total Recoverable Heat [MMBTU/h] | −11.6 | −17.2 | −18.5 | −12.6 |
| Net Heating Duty [MMBTU/h] | 18.5 | 6.8 | 8.4 | 7.5 |
| BTU/gallon of Ethanol | 27800 | 10200 | 12600 | 11300 |
| lb of Steam/gallon of Ethanol | 31.4 | 11.5 | 14.2 | 12.8 |

As the values in Table XVI indicate, the savings in energy are at least 55%. In addition to being energy-efficient, economical and environmentally friendly, the present invention offers many features and advantages. The invention can be used in green-field plants and may be economically and cost effectively applied for plant expansions. The invention can also be used in a wide range of industries including biofuel plants based on sugar and starch, as well as those using cellulosic, lignocellulosic, and industrial waste as feedstocks. Moreover, the invention is flexible in that it can be used to handle a wide range of feed materials and achieve a wide range of product specifications. In addition, the equipment needed for practicing the invention is compact with a small footprint, easily installed, and easy to control, operate and maintain. Start-up and shut-down are likewise quick and easy. The process equipment is also readily expanded easy due to its modular nature. The present invention is thus a substantial improvement over the current state of the art.

In the appended claim(s), the term "a" or "an" is intended to mean "one or more." The term "comprise" and variations thereof such as "comprises" and "comprising," when preceding the recitation of a step, unit, or section are intended to mean that the addition of further steps, units, or sections is optional and not excluded. All patents, patent applications, and other published reference materials cited in this specification are hereby incorporated herein by reference in their entirety. Any discrepancy between any reference material cited herein and an explicit teaching of this specification is intended to be resolved in favor of the teaching in this specification. This includes any discrepancy between an art-understood definition of a word or phrase and a definition explicitly provided in this specification of the same word or phrase.

What is claimed is:

1. A process for separating a feed mixture comprising (i) from about 1% to about 50% by weight of an organic substance whose normal boiling point is between 65° F. (18° C.) and the normal boiling point of water and that does not form a maximum boiling azeotrope with water, or whose normal boiling point is above the normal boiling point of water and that forms a minimum boiling azeotrope with water, (ii) dissolved solids, and (iii) water, said process comprising:

(a) distilling said feed mixture in a single distillation column to separate said feed mixture into a first intermediate stream rich in said organic substance relative to said feed mixture and a second intermediate stream that is depleted of said organic substance and rich in said dissolved solids relative to said feed mixture, under conditions whereby said first intermediate stream contains from about 50% to about 99.5% by weight of said organic substance, but below the azeotropic concentration in case of azeotropic mixture;

(b) passing at least a substantial fraction of said first intermediate stream through a first membrane that is selectively permeable to water and has a ratio of water permeation flux to flux of said organic substance of about 25 or greater, to separate said fraction of said first intermediate stream into
    a first product stream that is rich in said organic substance relative to said first intermediate stream and
    a second product stream that is depleted of said organic substance and rich in water relative to said first intermediate stream; and (c) passing at least a substantial fraction of said second intermediate stream through a second membrane having a dissolved solids rejection coefficient for selected solids of from about 65% to about 99.99%, to separate said fraction into
    a third product stream that is rich in said dissolved solids relative to said second intermediate stream and
    a fourth product stream that is depleted of said dissolved solids and rich in water relative to said second intermediate stream.

2. The process of claim 1 wherein said feed mixture is an output stream from a member selected from the group consisting of a reactor, an extractor, a precipitator, and a crystallizer.

3. The process of claim 1 wherein said organic substance is a member selected from the group consisting of alcohols, organic acids, esters, ketones, aldehydes, ethers, hemiacetals, acetals, amines, nitriles, mercaptans, aliphatic hydrocarbons, aromatic hydrocarbons, and chlorinated hydrocarbons.

4. The process of claim 1 wherein said organic substance is a $C_1$-$C_4$ alcohol.

5. The process of claim 1 wherein said feed mixture is a flowing stream flowing at a flow rate of from about 10 gallons per hour (37.9 liters per hour) to about 10,000 gallons per minute (37,854 liters per minute).

6. The process of claim 1 wherein said dissolved solids constitute from about 0.1% to about 40% of said feed mixture, by weight.

7. The process of claim 1 wherein step (a) is performed in a column that is a member selected from the group consisting of a plate column and a froth column.

8. The process of claim 1 wherein step (a) is performed in a plate column comprising a member selected from the group consisting of sieve trays, baffle trays, disc-and-donut trays, dual-flow trays, cartridge trays, bubble-cap trays, tunnel-cap trays, and valve trays.

9. The process of claim 1 wherein step (a) is performed at a pressure of from about 0.1 psia (0.7 KPa) to about 250 psig (1,825 KPa) and a temperature of from about 50° F. (10° C.) to about 500° F. (260° C.).

10. The process of claim 1 wherein step (a) comprises direct steam injection.

11. The process of claim 1 further comprising subjecting said feed mixture prior to step (a) to a member selected from the group consisting of filtration and membrane separation.

12. The process of claim 1 wherein said organic substance constitutes from about 60% to about 99.9% by weight of said first product stream.

13. The process of claim 1 wherein step (b) comprises operating said first membrane in either a pervaporation mode or a vapor permeation mode.

14. The process of claim 1 wherein step (b) comprises passing said first intermediate stream through said first membrane at a pressure of from about 5 psig (136 KPa) to about 250 psig (1,825 KPa) and a temperature of from about 65° F. (18° C.) to about 500° F. (260° C.).

15. The process of claim 1 wherein said first membrane has a water permeation flux of from about 50 GPU to about 25,000 GPU.

16. The process of claim 1 wherein said first membrane is an organic membrane selected from the group consisting of a glassy polymer membrane and an ion-exchange membrane.

17. The process of claim 1 wherein said first membrane is fabricated of an inorganic material selected from the group consisting of a hydrophilic zeolite and silica.

18. The process of claim 1 wherein said first membrane is in the form of a member selected from the group consisting of a hollow-fiber module, a tubular module, a monolithic module, a plate-and-frame module, a disk-tube module, and a spiral-wound module.

19. The process of claim 1 further comprising subjecting said first intermediate stream prior to step (b) to a member selected from the group consisting of vapor compression and membrane separation.

20. The process of claim 1 further comprising passing said first intermediate stream prior to step (b) through a mist eliminator.

21. The process of claim 1 further comprising subjecting said first product stream to a member selected from the group consisting of adsorption and membrane separation.

22. The process of claim 1 further comprising subjecting said second product stream to a member selected from the group consisting of distillation and membrane separation.

23. The process of claim 1 said dissolved solids constitute from about 0.2% to about 50% by weight of said second intermediate stream.

24. The process of claim 1 wherein said dissolved solids constitute from about 0.5% to about 60% by weight of said third product stream.

25. The process of claim 1 wherein step (c) comprises operating said second membrane in a member selected from the group consisting of an ultrafiltration mode, a nanofiltration mode, and a reverse osmosis mode.

26. The process of claim 1 wherein said substantial fraction of said second intermediate stream is liquid-phase and is fed to said second membrane at a pressure of from about 5 psig (136 KPa) to about 2500 psig (17,338 KPa) and a temperature of from about 50° F. (10° C.) to about 500° F. (260° C.).

27. The process of claim 1 wherein said second membrane has a ratio of water permeation flux to transmembrane pressure drop of from about 0.001 GFD/psi to about 10 GFD/psi.

28. The process of claim 1 wherein said second membrane is comprised of a member selected from the group consisting of an organic membrane and an inorganic membrane.

29. The process of claim 1 wherein said second membrane is in the form of a member selected from the group consisting of a hollow-fiber module, a tubular module, a monolithic module, a plate-and-frame module, a disk-tube module, and a spiral-wound module.

30. The process of claim 1 wherein step (c) comprises operating said second membrane in a member selected from the group consisting of an open-channel cross-flow filtration mode and a spacer-filled channel cross-flow filtration mode.

31. The process of claim 1 wherein step (c) further comprises enhancing said separation by shear enhancement of said membrane through use of a member selected from the group consisting of hydrodynamics, rotation of said first membrane, rotation of a mechanical device attached to said first membrane, and vibration of the surface of said first membrane.

32. The process of claim 1 further comprising subjecting said second intermediate stream prior to step (c) to a member selected from the group consisting of chemical treatment, centrifugation, dissolved air flotation, dispersed air flotation, biological treatment, and membrane separation.

33. The process of claim 1 further comprising subjecting said third product stream to a member selected from the group consisting of evaporation, drying, and membrane separation.

34. The process of claim 1 further comprising subjecting said fourth product stream to a member selected from the group consisting of biological treatment, carbon adsorption, and membrane separation.

35. The process of claim 1 wherein step (a) is performed without reflux.

36. The process of claim 1 wherein step (a) is performed with reflux.

37. The process of claim 1 further comprising performing phase separation on said first intermediate stream prior to step (b).

38. The process of claim 1 wherein step (c) comprises operating said second membrane in a membrane distillation mode.

39. A process for separating a feed mixture comprising (i) from about 1% to about 50% by weight of an organic substance whose normal boiling point is between 65° F. (18° C.) and the normal boiling point of water and that does not form a maximum boiling azeotrope with water, or whose normal boiling point is above the normal boiling point of water and that forms a minimum boiling azeotrope with water and (ii) from about 0.1% to about 40% by weight of dissolved solids with (iii) water as the balance, said process comprising:

(a) distilling said feed mixture in a single distillation column at a pressure of from about 5 psig (136 KPa) to about 150 psig (1,136 KPa) and a temperature of from about 80° F. (27° C.) to about 450° F. (232° C.) to produce a first intermediate stream rich in said organic substance relative to said feed mixture and a second intermediate stream that is depleted of said organic substance and rich in said dissolved solids relative to said feed mixture, under conditions whereby said first intermediate stream contains from about 50% to about 99.5% by weight of said organic substance, but below the azeotropic concentration in case of azeotropic mixture;

(b) passing at least a substantial fraction of said first intermediate stream through a first membrane at a pressure of from about 5 psig (136 KPa) to about 150 psig (1,136 KPa) and a temperature of from about 80° F. (27° C.) to about 450° F. (232° C.), in a mode selected from the group consisting of vapor permeation and pervaporation, said first membrane having a water permeation flux of from about 50 GPU to about 25,000 GPU and a ratio of water permeation flux to permeation flux of said organic substance of from about 25 or greater, to separate said first intermediate stream into a first product stream that is rich in said organic substance relative to said first intermediate stream and a second product stream that is depleted of said organic substance and rich in water relative to said first intermediate stream; and (c) passing said second intermediate stream through a second membrane at a pressure of from about 5 psig (136 KPa) to about 2500 psig (17,338 KPa) and a temperature of from about 50° F. (10° C.) to about 500° F. (260° C.), in a mode selected from the group consisting of ultrafiltration, nanofiltration, and reverse osmosis, said second membrane having a ratio of water permeation flux to transmembrane pressure drop of from about 0.001 GFD/psi to about 10 GFD/psi and a dissolved solids rejection coefficient for selected solids of from about 65% to about 99.99%, to separate said second intermediate stream into a third product stream that is rich in said dissolved solids relative to said second intermediate stream and a fourth product stream that is depleted of said dissolved solids and rich in water relative to said second intermediate stream.

40. A process for separating a feed mixture containing (i) from about 1% to about 50% by weight of an organic substance whose normal boiling point is between 65° F. (18° C.) and the normal boiling point of water and that does not form a maximum boiling azeotrope with water, or whose normal boiling point is above the normal boiling point of water and that forms a minimum boiling azeotrope with water and (ii) from about 0.1% to about 40% by weight of dissolved solids with (iii) water as the balance, said process comprising:

(a) distilling said feed mixture in a single distillation column at a pressure of from about 5 psia (34 KPa) to about 50 psig (446 KPa) and a temperature of from about 50° F. (10° C.) to about 400° F. (204° C.) to produce a first intermediate stream rich in said organic substance relative to said feed mixture and a second intermediate stream that is depleted of said organic substance and rich in said solids relative to said feed mixture, under conditions whereby said first intermediate stream contains from about 50% to about 99.5% by weight of said organic substance, but below the azeotropic concentration in case of azeotropic mixture;

(b) compressing said first intermediate stream to a pressure of from about 5 psig (136 KPa) to about 150 psig (1,136 KPa);

(c) passing said first intermediate stream through a first membrane at a pressure of from about 5 psig (136 KPa) to about 150 psig (1,136 KPa) and a temperature of from about 80° F. (26° C.) to about 450° F. (232° C.), in vapor permeation mode, said first membrane having a water permeation flux of from 50 GPU to about 25,000 GPU and a ratio of water permeation flux to permeation flux of said organic substance of from about 25 or greater, said first membrane separating said first intermediate stream into a first product stream that is rich in said organic substance relative to said first intermediate stream and a second product stream that is depleted of said organic substance and rich in water relative to said first intermediate stream; and (d) passing said second intermediate stream through a second membrane at a pressure of from about 5 psig (136 KPa) to about 2500 psig (17,338 KPa) and a temperature of from about 50° F. (10° C.) to about 500° F. (260° C.), in a mode selected from the group consisting of ultrafiltration, nanofiltration, and reverse osmosis, said second membrane having a ratio of water permeation flux to transmembrane pressure drop of from about 0.001 GFD/psi to about 10 GFD/psi and a dissolved solids rejection coefficient for selected solids of from about 65% to about 99.99%, to separate said second intermediate stream into a third product stream that is rich in said dissolved solids relative to said second intermediate stream and a fourth product stream that is depleted of said dissolved solids and rich in water relative to said second intermediate stream.

41. A process for separating a feed mixture comprising (i) from about 1% to about 50% by weight of an organic substance whose normal boiling point is between 65° F. (18° C.) and the normal boiling point of water and that does not form a maximum boiling azeotrope with water, or whose normal boiling point is above the normal boiling point of water and that forms a minimum boiling azeotrope with water, (ii) ionized solids, and (iii) water, said process comprising:

(a) distilling said feed mixture in a single distillation column to separate said feed mixture into a first intermediate stream rich in said organic substance relative to said feed mixture and a second intermediate feed stream that is depleted of said organic substance and rich in said ionized solids relative to said feed mixture, under conditions whereby said first intermediate stream contains from about 50% to about 99.5% by weight of said organic substance, but below the azeotropic concentration in case of azeotropic mixture;

(b) passing at least a substantial fraction of said first intermediate stream through a first membrane that is selectively permeable to water and has a ratio of water permeation flux to flux of said organic substance of about 25 or greater, to separate said fraction of said first intermediate stream into
a first product stream that is rich in said organic substance relative to said first intermediate stream and
a second product stream that is depleted of said organic substance and rich in water relative to said first intermediate stream; and (c) passing at least a substantial fraction of said second intermediate stream through a second membrane operating in a member selected from the group consisting of an electrodialysis mode and an electrodialysis reversal mode to separate said fraction into
a third product stream that is rich in said ionized solids relative to said second intermediate stream and
a fourth product stream that is depleted of said ionized solids and rich in water relative to said second intermediate stream.

* * * * *